United States Patent [19]

Yokodate et al.

[11] Patent Number: 5,230,015
[45] Date of Patent: Jul. 20, 1993

[54] METHOD AND APPARATUS FOR STATIC VIDEO TELEPHONE TRANSMISSION/RECEIVING

[75] Inventors: Shinya Yokodate; Koji Kaneko; Kazuyuki Saigusa; Tatsuhiko Mizushima, all of Kamakura, Japan; Scott A. Lewis, Davis; Gary S. Fletcher, Rocklin, both of Calif.

[73] Assignees: Mitsubishi Denki Kabushiki Kaisha, Tokyo, Japan; Mitsubishi Electronics America, Inc., Cypress, Calif.

[21] Appl. No.: 688,158

[22] Filed: Apr. 19, 1991

Related U.S. Application Data

[63] Continuation-in-part of Ser. No. 538,090, Jun. 13, 1990, abandoned.

[30] Foreign Application Priority Data

Jun. 15, 1989 [JP] Japan .................................. 1-152908

[51] Int. Cl.⁵ ........................ H04M 11/00; H04N 7/12
[52] U.S. Cl. ........................................ 379/53; 358/23; 375/97; 455/71
[58] Field of Search ........................ 379/53, 54, 96-98; 358/23, 85, 134, 141, 142, 409, 410, 434, 436-438; 455/71; 375/97, 111

[56] References Cited

U.S. PATENT DOCUMENTS

| | | | |
|---|---|---|---|
| 4,485,400 | 11/1984 | Lemelson et al. | 379/53 |
| 4,715,059 | 12/1987 | Cooper-Hart et al. | 379/53 |
| 4,881,253 | 11/1989 | Takeuchi et al. | 379/53 |
| 4,932,047 | 6/1990 | Emmons et al. | 379/53 |
| 4,979,028 | 12/1990 | Minematsu et al. | 379/53 |

FOREIGN PATENT DOCUMENTS

| | | |
|---|---|---|
| 0134860 | 3/1985 | European Pat. Off. |
| 0206572 | 12/1986 | European Pat. Off. |
| 0314122 | 5/1989 | European Pat. Off. |

OTHER PUBLICATIONS

"Television Technics & Electronics" vol. 36 pp. 19-35, Sep. 1988.

Primary Examiner—James L. Dwyer
Assistant Examiner—Wing F. Chan

[57] ABSTRACT

A static video telephone for sending an image captured by an image capture-system and receiving a video signal transmitted over a telephone line. A video signal formed for transmission has a frame format including a phase shift correction data signal in addition to a frame synchronization signal, an amplitude calibration signal, an ID (information data) signal, and image data signal. The video telephone includes a frequency shift correction data generating circuit which is activated when frequency shifts are detected in the received signal and produces frequency-shift correction data. The frequency-shift correction data is then delivered to a subsequent demodulation timing generating circuit which scales phase errors in the received signal to produce phase error correction data. Both frequency-shift correction data and phase error correction data are combined together to produce a demodulation timing signal. With this signal, the received signal is demodulated.

14 Claims, 18 Drawing Sheets

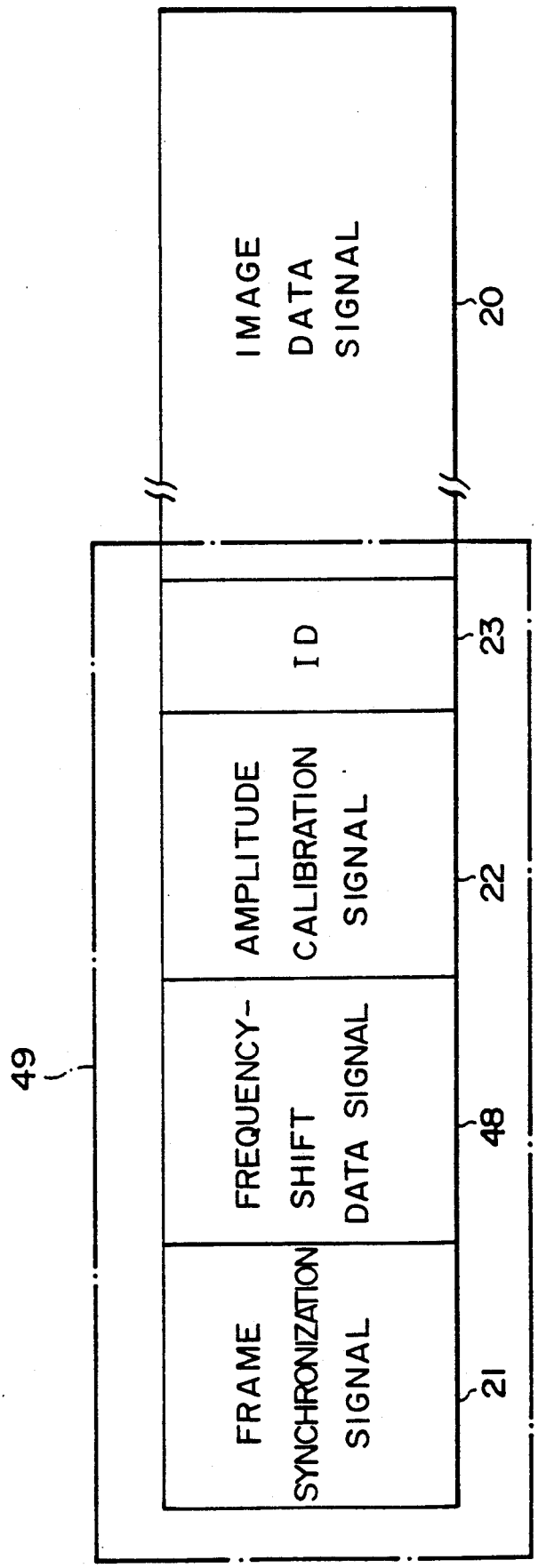

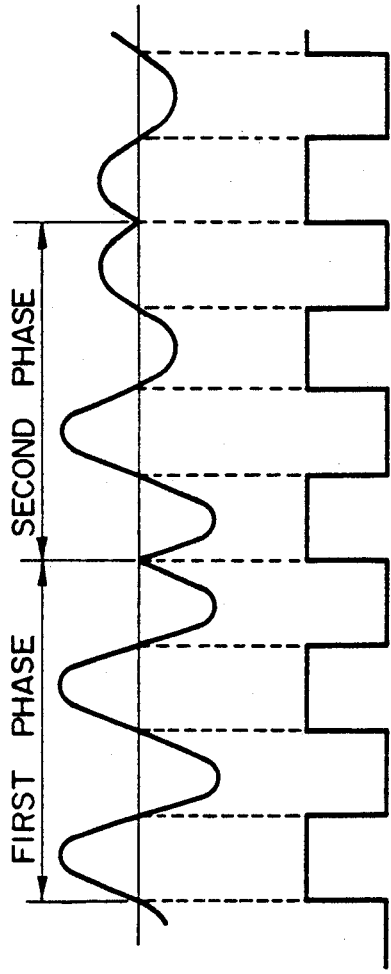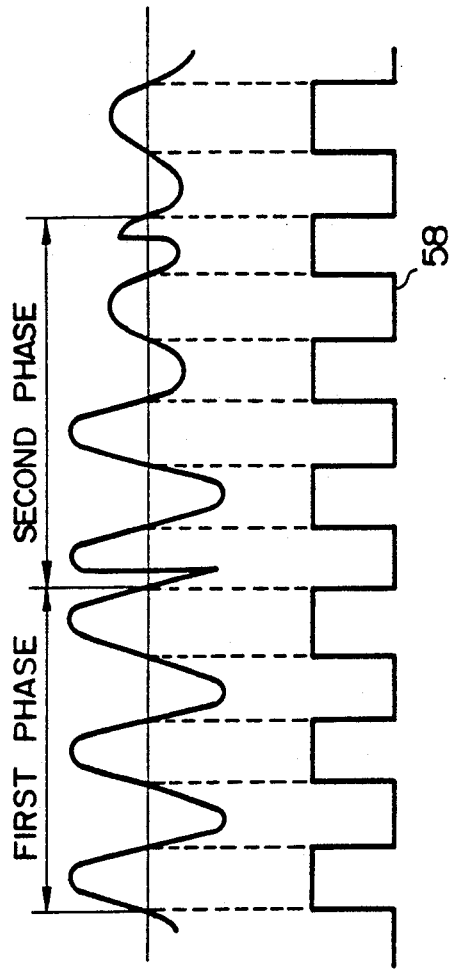

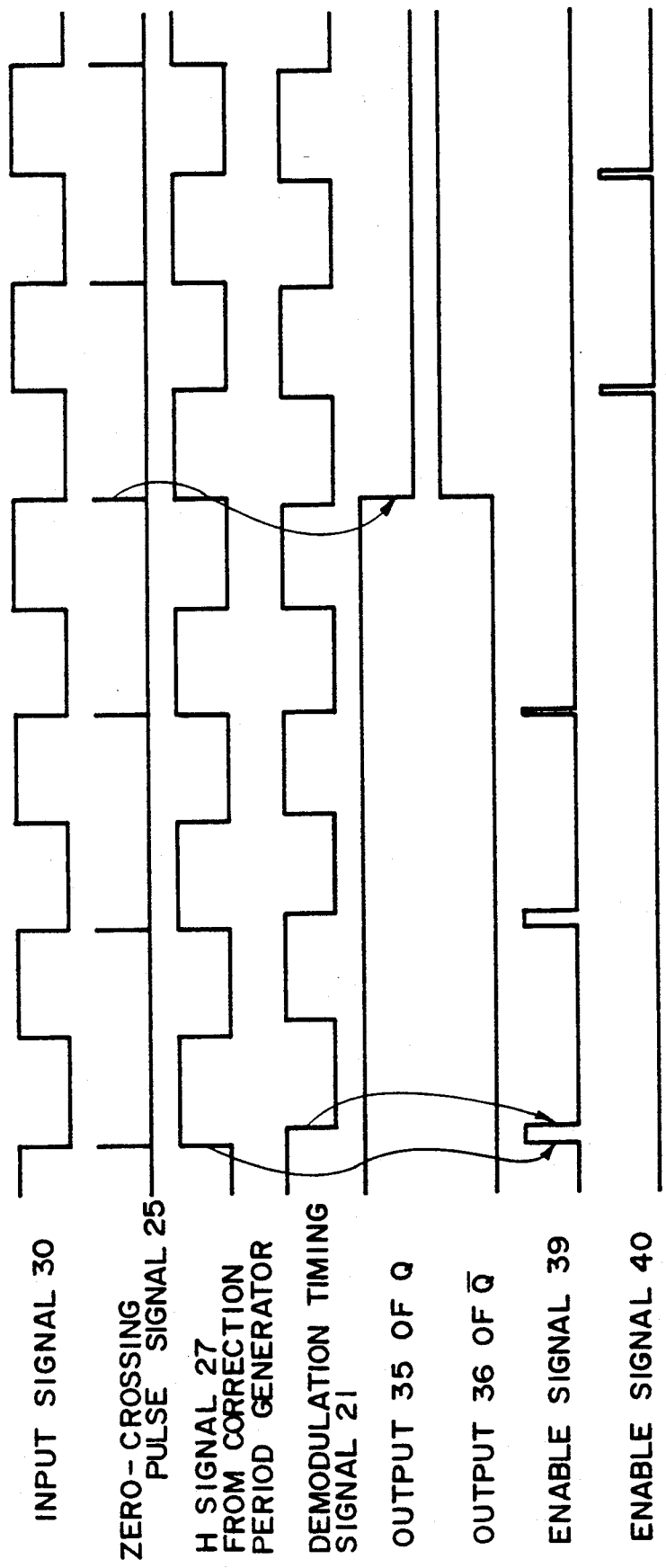

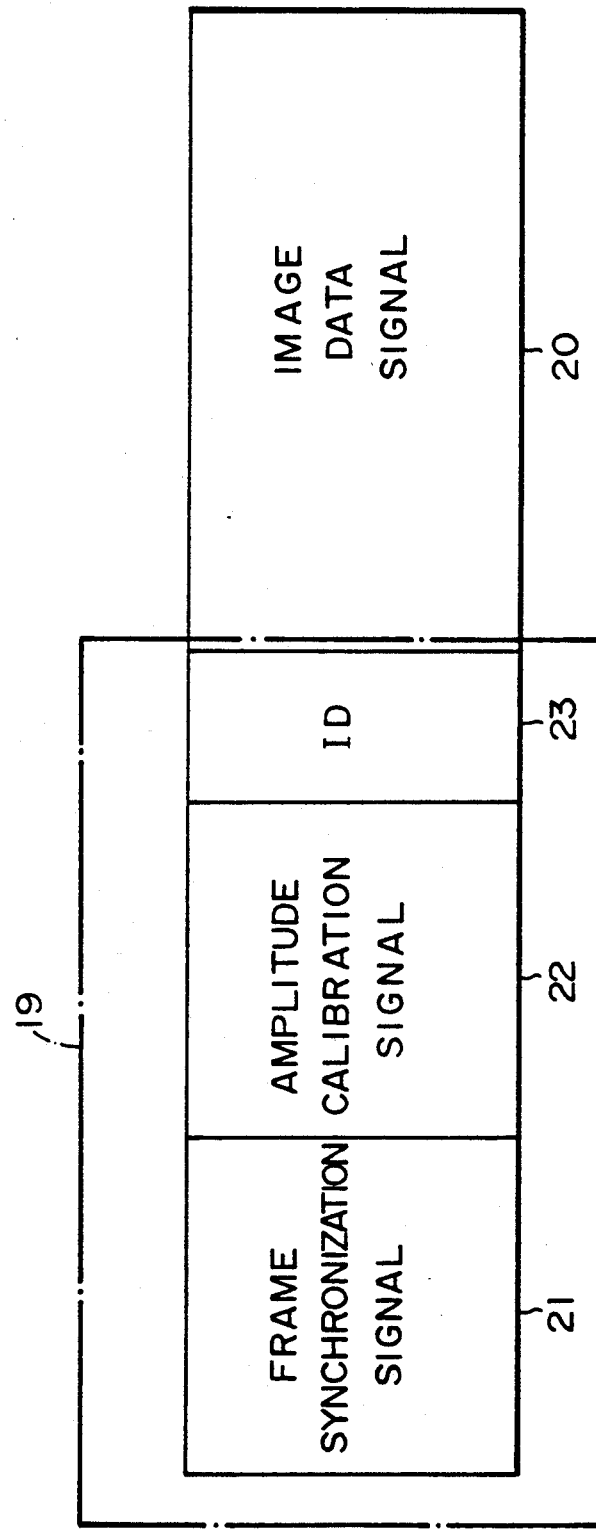

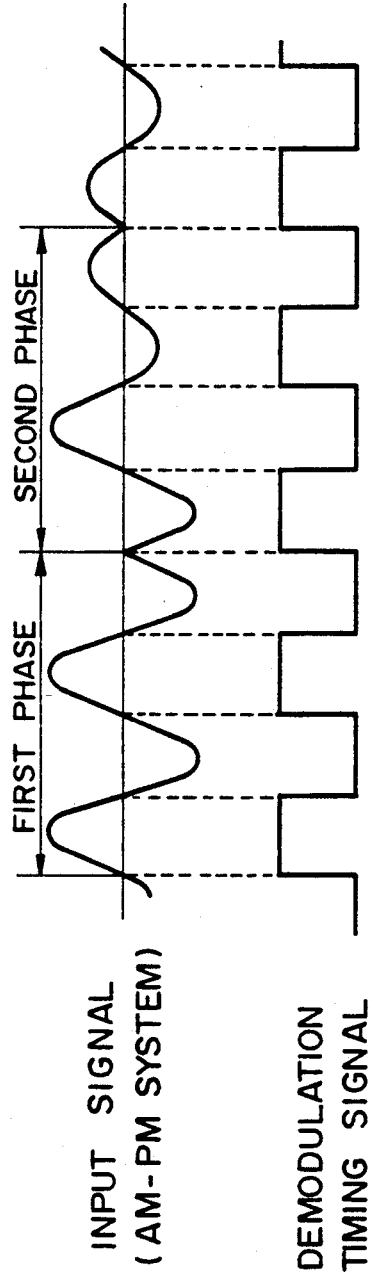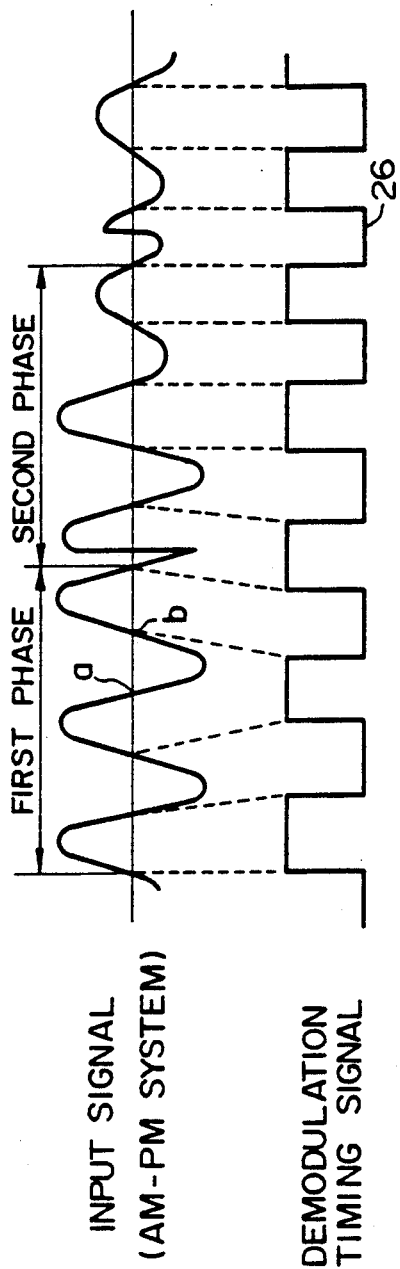

METHOD AND APPARATUS FOR STATIC VIDEO TELEPHONE TRANSMISSION/RECEIVING

This application is a continuation-in-part of application Ser. No. 07/538,090 filed on Jun. 13, 1990 now abandoned.

BACKGROUND OF THE INVENTION

1. Field of the Invention

This invention relates to a method and an apparatus for static video telephone transmission/receiving, and more particularly to a method and an apparatus for a static video telephone transmission and receiving for modulating a static video signal captured by an image-capture system into a voice band signal, sending the modulated signal along a telephone line during a conversation, demodulating the static video signal received over the telephone line, and presenting an image on a display unit.

2. Description of the Related Arts

Although there has been a demand for a video telephone capable of transmitting voice and image data simultaneously over a telephone network, it is difficult to successively send and receive motion pictures which require a huge amount of data over the conventional voice grade telephone network. For this reason, a static video telephone for sending a static image to a speaker on the other end of the line during a conversation has now been put into practice.

With this static video telephone, during a normal voice conversation, it is possible to send images such as the face of a speaker, a picture or a drawing associated with contents of the conversation with a temporary interruption of the voice conversation.

Therefore, according to such a static video telephone, it is possible to realize transmission and receiving of image data which used to be impossible over the telephone line. The realization of a video telephone is advantageously facilitated because only one static image is transmitted at a time and the amount of data to be processed is limited.

Existing static video telephones capable of transmitting a static video image are introduced in a magazine entitled "TELEVISION TECHNICS & ELECTRONICS" VOL. 36 in 1988 pp. 19-35, and a block diagram of one of the video telephones is shown in FIG. 12 of the accompanying drawings.

As a technique for carrying out static video transmission set forth in the above, a phase-amplitude modulation technique is disclosed in U.S. Pat. No. 4,739,413. This technique is for sending monochromatic image data with its band width suppressed by the use of a multiple amplitude, two-phase modulation method.

In FIG. 12, a static video telephone 1 is composed of a telephone terminal 2 for connecting a non-illustrated external telephone set, a terminal 3 for telephone line input, a recording terminal 4 for connecting a tape recorder, a terminal 5 for image reproduction, telephone/reproduction changeover switch 6, and a key pad 7 for instructing video transmission, thereby connecting with external devices and the network.

Further, the static video telephone 1 is provided with a network circuit 8, a modulation-demodulation circuit 9 (hereinafter referred to as a "modem"), a demodulation timing generator 10, an analog/digital converter 11, a central processing unit 12 (hereinafter called a "CPU"), an image controller 13, an image memory 14, a digital/analog converter 15, a display 16, an analog/digital converter 17, and a television camera 18.

The operation of the conventional static video telephone will be explained with reference to FIG. 12.

In practice, a voice conversation input from the telephone set externally provided is transmitted from the telephone line terminal 3 via the external telephone terminal 2 and the network circuit 8. Meanwhile, a voice signal received from the remote end is transferred to the external telephone in reverse order to the transmission, namely, by way of the telephone line terminal 3, the network circuit 8, the external telephone terminal 2. and the non-illustrated external telephone set.

At the time of transmitting a video signal, the CPU 12 detects a transmission of video signal instruction issued by an operation of the key pad 7. The CPU 12 adds a control signal to image data memorized in the image memory 14 in accordance with a program stored in the CPU 12, and sends the image data with the information signal to the telephone line terminal 3 via the modem circuit 9 and the network circuit 8.

In the meantime, at the time of receiving a static video signal, the signal is transferred to the modem circuit 9 in the route reverse route to that of transmission. The video data from the partner in the conversation is demodulated by the modem circuit 9 with the use of a timing signal generated by the demodulation timing signal generator 10, and the demodulated video signal is then transferred to the image memory 14 into the analog-digital converter 11, the CPU 12 and the image controller 13, and once stored there can thereafter be shown on the display 16.

Upon completion of the transmission and receiving of the video signal, the network circuit 8 restores the video telephone 1 to a voice communication mode. The image captured by the television camera 18 during the conversation is digitized and stored in the image memory 14 by way of the image controller 13 and then the digitized data is used to produce an image on the display 16.

Referring to FIGS. 13, 14, 15 and 16, the structure of a frame format and the video signal transmission of a static video signal for use in a conventional static video telephone will be described hereunder.

The frame format of a static video signal for use in transmission and receiving of a static video signal is chiefly divided into two parts, that is, a control information block 19 and an image data signal 20 as shown in FIG. 15. The control information block 19 serves for demodulating an image data signal properly and consists of a frame synchronization signal 21, an amplitude calibration signal 22, and an information data signal 23 (hereinafter abbreviated as ID).

The frame synchronization signal 21 is that used for generating a demodulating timing signal as shown in FIG. 16A and also for switching between voice communication mode and video transmission/receiving mode. The amplitude calibration signal 22 is a signal for determining the level of automatic gain control (AGC) and thus the gradation of the video signal. The ID signal 23 is data providing a mutual identification capability.

Referring to FIGS. 13 and 14, the operation of the conventional demodulation timing generator 10 for use in the existing static video telephone as set forth in the above will be explained. FIG. 13 is a block diagram of the conventional demodulation timing generator 10, and FIG. 14 is a timing chart of the demodulation timing generator 10.

In FIG. 13, the conventional demodulation timing generator 10 comprises a zero-crossing detector 24 for detecting zero crossings of an input signal, a zero-crossing corrector 28 for producing an output of errors between a zero-crossing pulse signal 25 output from the zero-crossing detector 24 and a demodulation timing signal 26 as phase error data 27, and a demodulation timing generation block 29 for generating a demodulation timing signal 26 in response to the phase error data 27.

The operation of this demodulation timing generator 10 will be described hereinbelow.

Zero crossings at the trailing edge of a static video signal 30 input by way of the modem circuit 9 are detected by two flip-flops and a NOR gate in the zero-crossing detector 24, and are output as the zero crossing pulse signal 25. This zero-crossing pulse signal 25 is input to a correction period generating circuit 31 for determining a correction period.

At the correction period generating circuit 31, every time the zero-crossing pulse signal 25 is input, a signal 32 is output at a high logic level for a predetermined period equivalent to about half of 1747.8 MHz. During that time, a D-Type flipflop 33 of the zero crossing detector 28 detects whether the trailing edge of the demodulation timing signal 26 advances or retards compared with the zero-crossing pulse signal 25. When the demodulation timing signal 26 as shown in FIG. 14 is output from a programmable counter 34, for instance, the D-Type flipflop 33 outputs pulse signals 35 and 36 as shown in FIG. 14. During the high period of the signal 35, since the trailing edge of the demodulation timing signal 36 is delayed compared with the zero-crossing pulse signal 25, the programmable counter 34 is instructed so as to be advanced. However, during H period of the signal 36, since the trailing edge of the demodulation timing signal 26 advances compared with the zero-crossing pulse signal 25, the programmable counter 34 is instructed so as to be delayed. Both of these signals 35 and 36 are delivered to an AND gate 37 for generating an enable signal for an error detecting counter 41 and to an AND gate 38 for generating an enable signal for an error detecting counter 42, respectively.

An output signal 39 of the AND gate 37 represents the degree of delay of the demodulation timing signal 26 whereas an output signal 40 of the AND gate 38 represents the degree of advancement of the demodulation timing signal 26.

Counters 41, 42 in the next stage are clocked by a clock signal $f_{CLKM}$ which is obtained by dividing the reference clock 14.31818 MHz by a integral factor of M while the signals 39 and 40 are high. Values counted at these counters are transferred to a 2:1 selector 43. This selector 43 chooses a phase error data 44 when the signal 36 is low, but chooses a phase error data 45 when the signal 36 is high. The selected data 27 is then transmitted to a +8192 adder 46. The +8192 adder 46 adds 8192 to the phase error data 27 and outputs frequency dividing data 47 to the programmable counter 34. The programmable counter 34 divides the reference clock 14.31818 MHz in response to the frequency dividing data 47 and outputs it as the demodulation timing signal 26.

Thus, the conventional demodulation timing signal generator 10 can correct small impairments such as line shift. A maximum correction of the conventional generator 10 during one cycle of the input data is however limited to (an amount of phase errors/M)×2.

Since the conventional static video telephone has the structure being set forth in the above, if a frequency shift exceeds the maximum correcting amount of phase shift of the above, the demodulation timing signal 26 may not be corrected or may be unstable as represented by zero crossings a and b of FIG. 16B.

SUMMARY OF THE INVENTION

The present invention provides a modulation and demodulation method for use in transmitting static video data, that enables correction of frequency shift caused by variable transmission line effects, at the same time as dealing with a large number of phase errors. At the modulation stage, the frame format of the static video signal, as well as containing the usual frame synchronization signal, amplitude correction signal and information data signal, also contains a control information block which includes a frequency shift data signal.

Using this information at the demodulating end, a counter can be enabled for a predetermined period of time during receiving of the static video signal, and a value corresponding to the length of the frame will be obtained. This is compared to a value which should be obtained if no frequency shift occurs and so a value corresponding to the degree of frequency shift currently occurring in that particular telephone line and signal is derived.

At the same time, phase error data is generated by the demodulation timing generation circuit by comparing the positions of zero crossing points of an input signal relative to a demodulation timing signal. A figure to be added to a subtracted from a +8192 adder is obtained dependent upon whether the input signal is advanced or delayed and so a phase error data signal is produced.

In this invention, however, the frequency shift data is also included when deriving the number to be input to the +8192 adder so that large frequency shift errors can be considered in conjunction with phase errors.

The demodulation timing generation circuit uses both error signals to effect an adjustment to the demodulation timing supplied to the MODEM so that the aforementioned errors can be compensated for.

BRIEF DESCRIPTION OF DRAWINGS

The novel features believed characteristic of the invention are set forth in the appended claims. The invention itself, however, as well as other features and advantages thereof will be best understood by reference to the detailed description which follows read in conjunction with the accompanying drawings, wherein:

FIG. 2 is a schematic representation of a frame format of a static video signal for use in the static video telephone transmission method;

FIGS. 10(A) and 10(B) are a schematic representation showing a relationship between an input static video signal and a demodulation timing signal;

FIG. 14 is a timing chart of the demodulation timing generator of FIG. 13;

FIG. 15 is a schematic representation of a frame format of a static video signal for use in transmission and receiving of a conventional static video signal; and FIGS. 16(A) and 16(B) are a schematic representation showing a relationship between an input signal and a demodulation timing signal of the conventional static video telephone of FIG. 12.

DETAILED DESCRIPTION OF THE PREFERRED EMBODIMENTS

First Embodiment

Figure 1A:
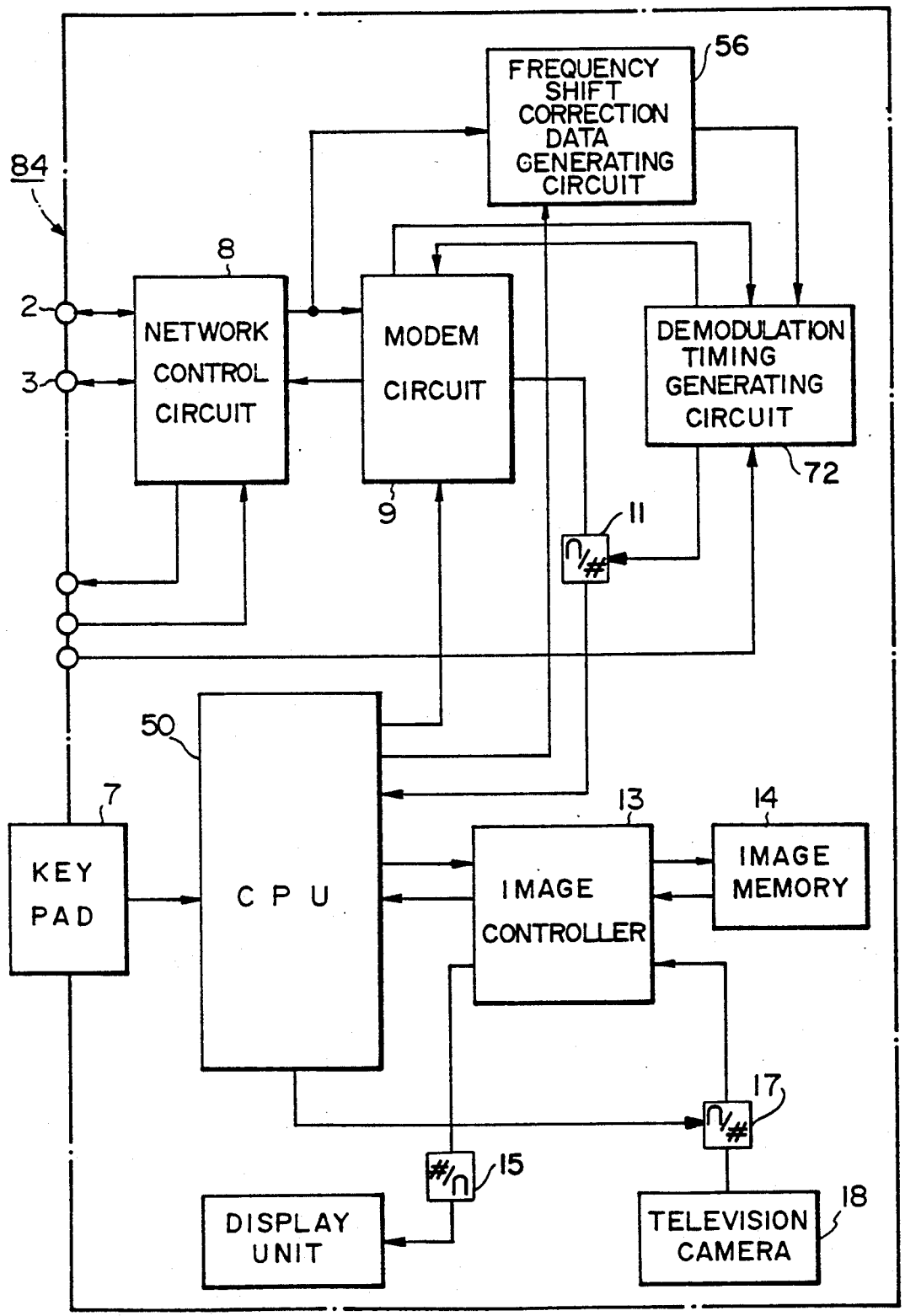
FIG. 1A is a block diagram showing a circuit configuration of a static video telephone apparatus employing a static video transmission method in accordance with a first embodiment of the invention.

Referring to FIG. 1A of the accompanying drawings, a static video telephone transmission method according to a first embodiment of this invention will be described hereinbelow.

In FIG. 1A, a static video telephone set 84 employing a static video telephone transmission method comprises a television camera 18 for capturing images upon receipt of transmission of a video signal instruction issued from a key pad provided on an exterior surface of the telephone set; an analog-digital converter 17 for transforming analog video signals input from the television camera 18 into digital data; an image controller 13 for controlling the image data from the analog-digital converter 17; an image memory 14 for storing the image data transferred via the image controller 13; a central processing unit 50 for producing a static video signal by adding a predetermined frame format to the video data being input from the image memory via the image controller 13; a modem circuit 9 for modulating the static video signal with a phase amplitude modulation; and a network control circuit 8 for producing an output of the modulated static video signal onto the telephone line. Moreover, on the surface of the static video telephone 84 are provided a terminal 2 for an externally connected telephone set and a terminal 3 for connection with the telephone line.

A frame format for executing a static video telephone transmission method will be described with reference to FIG. 2. In addition to the conventional frame synchronization signal 21, the amplitude correction signal 22, and the information data signal 23, the static video signal also consists of a control information block 49 including a frequency shift data signal 48 for use in correcting impairments of the signal such as frequency shifts which may occur during transmission and an image data signal 20.

Figure 1B:
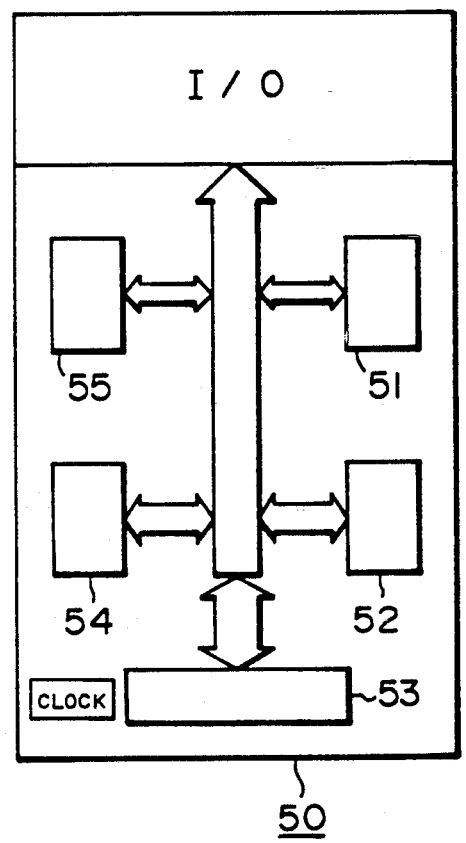
FIG. 1B is a block diagram illustrating internal structure of CPU 50 of FIG. 1A.

With reference to FIG. 1A and FIG. 1B and FIG. 2, the operation of the static video telephone employing this transmission method will be described hereunder.

The issuing of an instruction to send images from the key pad 7 shown in FIG. 1A will be detected by the CPU 50, and, in accordance with an internal program, the control information signal is added to the image data which has been captured by the television camera 18 and once stored in the image memory 14 by means of a frame synchronizing signal generating section 51, a frequency shift information signal generating section 52, an amplitude correction signal generating section 53, an information data generating section 54, and a video signal generating section 55, all of which are included inside the CPU 50, and the video signal having the frame format is then transferred to the modem circuit 9. The video signal having been subjected to the phase-amplitude modulation by the modem circuit 9 is then transmitted along the telephone line from the terminal 3 via the network circuit 8. The control information block 49 being added to the video signal contains the frequency shift data signal characterizing the present invention.

Second Embodiment

Figure 3:
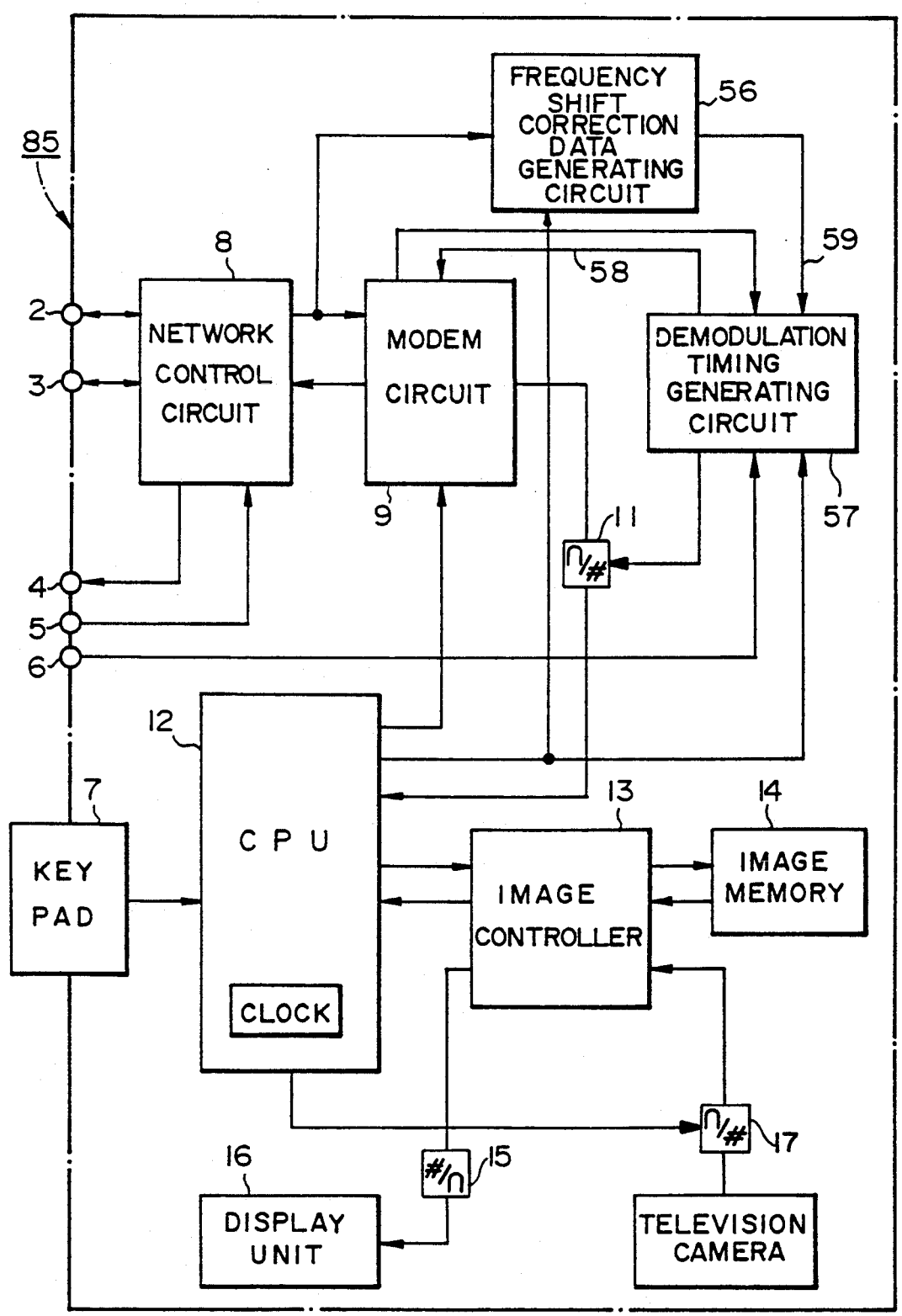
FIG. 3 is a block diagram of a static video telephone employing a static video telephone receiving method according to a second embodiment of the present invention.

Referring to FIG. 3, a static video telephone employing the static video telephone receiving method will be described.

FIG. 3 is a block diagram of a static video telephone employing a method for static video telephone receiving according to a second embodiment of the present invention.

In FIG. 3, a telephone set 85 comprises a network circuit 8 for receiving a static video signal transmitted over the telephone line; a frequency shift correction data generating circuit 56 for scaling a frequency shift data signal 48 included in the receiving signal and producing frequency shift correction data 56; a demodulation timing generating circuit 57 for producing a demodulation timing signal 58 on the basis of the frequency shift correction signal 59, the received signal transferred by way of a modem circuit 9, and a reference clock signal from a CPU 12; the modem circuit 9 for demodulating the received signal in response to the demodulation timing signal 58 supplied from the demodulation timing signal generating circuit 57; an image memory 14 for storing the video signal which has been quantized by an analog-digital converter 11 and transferred by way of the CPU 12; a digital-analog converter 15 for converting the stored image data into an analog image signal; and a display unit 16 for visually outputting an image.

Moreover, upon the surface of the video telephone set 85, there are provided a terminal for an externally provided telephone 2, a terminal for connecting a telephone line 3, a terminal 4 for recording, a terminal 5 for reproducing a recorded image, a conversation/reproducing mode changeover switch 6 and a key pad 7.

The operation of the static video telephone employing the static video signal receiving method according to this invention will now be described with reference to FIG. 3.

Much as in the conventional static video telephone, the frame synchronization signal 21 of a static video signal input from the telephone line through the network circuit 8 is demodulated by means of a signal, from the demodulation timing signal generating cirucit 57, which is not subjected to correction in response to frequency shift correction data from the frequency shift correction data generating circuit 56, and the demodulated data is transferred to the CPU 12. Upon detecting the end of the frame synchronization signal 21, the CPU 12 activates the frequency shift correction data generating circuit 56. The frequency shift correction data generating circuit 56 quantifies how much frequency shift occurs in the telephone line and sends the frequency shift correction data 59 to the demodulation timing generating circuit 57. The demodulation timing generating circuit 57 adds the frequency shift correction signal 59 to phase-shift correction data obtained from the receiving signal to produce a demodulation timing signal 58. The received static video signal is demodulated in the modem circuit 9 in response to the demodulation timing signal 58. This demodulated image signal is then stored in the image memory 14 as video data via the analog-digital converter 11, the CPU 12, and the image controller 13. The stored video data is visualized on the display 16 by way of the image controller 13 and the digital-analog converter 15.

Figure 4:
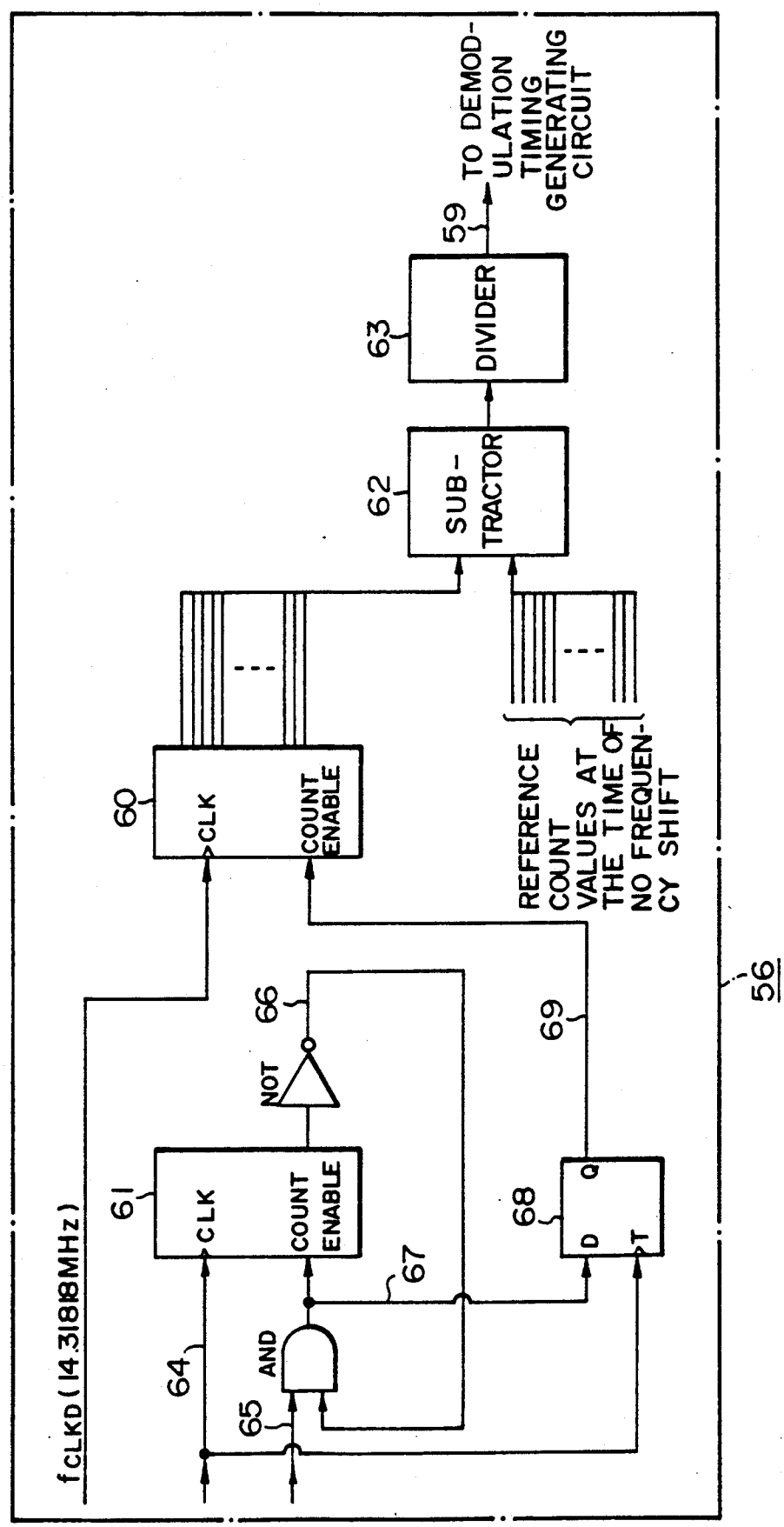
FIG. 4 is a block diagram of a frequency shift correction data generating circuit used in the static video telephone shown in FIG. 3.

The operation of the frequency-shift correction data generating circuit 56 according to the present invention will be described in detail with reference to FIGS. 4 and 5. FIG. 4 is a detailed schematic representation showing the structure of the frequency-shift correction data generating circuit 56, and FIG. 5 is a timing chart of the enable signal for the frequency-shift measuring counter.

In FIG. 4, the frequency-shift correction data generating circuit 56 is composed of a counter 60 for scaling frequency shifts; a 256-cycle counter 61 for producing an enable signal for activating the counter 61; a subtracter 62 for subtracting an actual count value measured by the frequency-shift measuring counter 60 from an ideal count value at the time of no frequency shifts; and a divider 63 for dividing an output from the subtracter 62 into 256.

Assuming that the TTC standard signal at a frequency of 1747.8 Hz transmitted for 256 cycles is being used for the frequency shift data signal 48 shown in FIG. 2, the operation of the enable signal generating section of the 256 cycle counter 61 will be described upon reference of FIGS. 3, 4 and 5.

Figure 5:
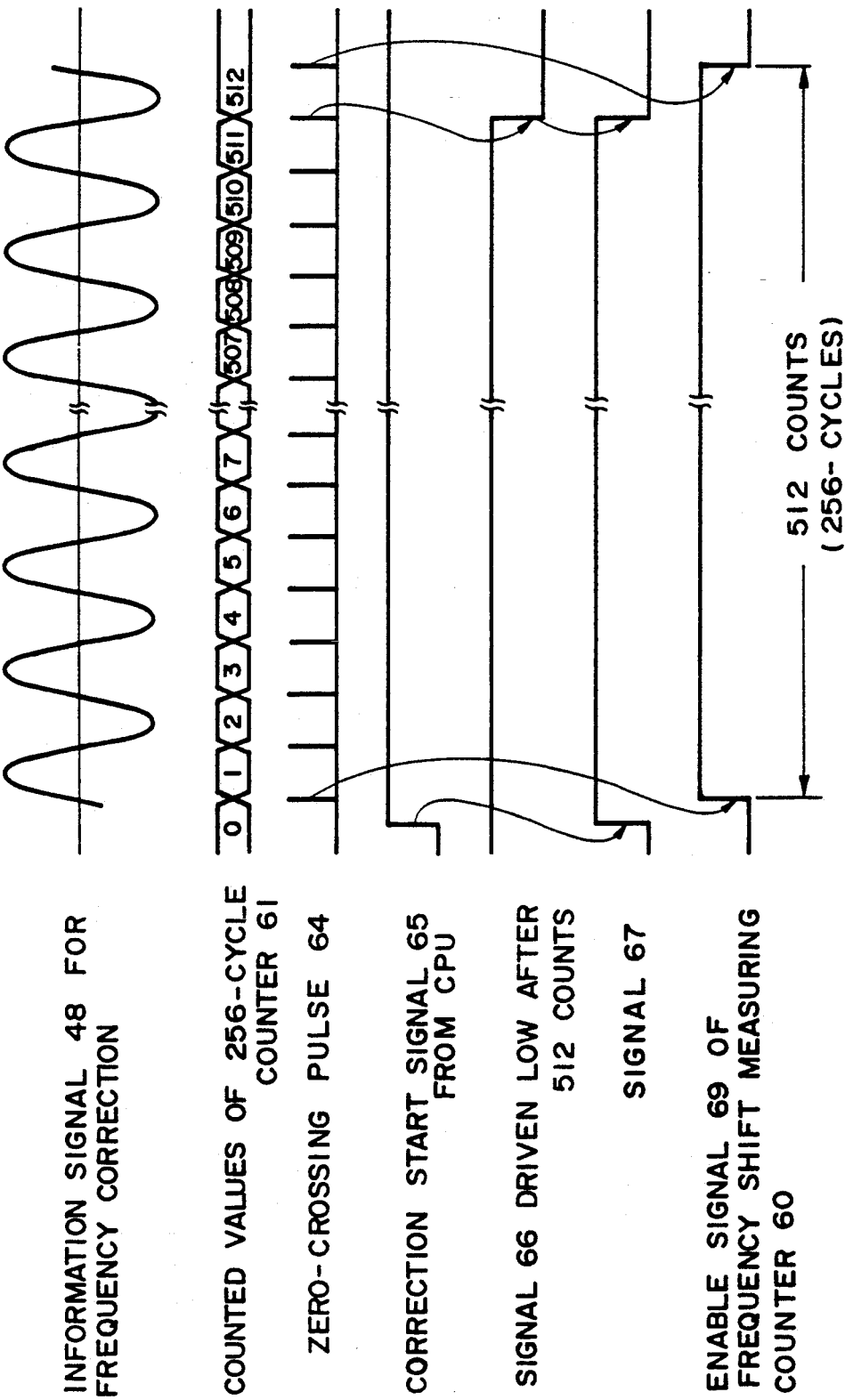
FIG. 5 is a timing chart of the frequency shift correction data generating circuit of FIG. 4.

First, a signal 64 of FIG. 5 such as a clock pulse signal is input to the 256-cycle counter 61. The leading edge and the trailing edge of the pulse represent the zero-crossings of the static video signal being input by way of the network circuit 8. Another signal 65 is a frequency-shift scaling start signal which starts at a high level delivered from the CPU 12. The 256-cycle counter 61 initiates its counting operation in response to the signal 65, and when the counter counts up to 512, a signal 66 is issued from the 256-cycle counter 61. This signal 66 becomes a low level at every 512 counts, and is ANDed with signal 65 and produces signal 67 which is an enable signal for the 256-cycle counter 61. However, this enable signal 67 cannot be a period of 256 cycles because the start signal 65 from the CPU 12 is not synchronous with the zero-crossing pulse signal 64. Accordingly, the signal 67 is synchronized with the zero-crossing signal 64 at a D-Type flipflop 68 and is finally issued as being an enable signal 69 for the frequency-shift scaling counter 60.

Here, the operation of the frequency-shift scaling counter 60 will be explained. This counter 60 counts the reference clock of 14.31818 MHz issued from the CPU 12 during the H period of the signal 69.

In the case where the frequency signal of 1747.8 Hz is varied to a signal of 1737 Hz, a value of $$(14.31818 \text{ (MHz)}/1737 \text{ (Hz)}) \times 256 = 2110221$$

is counted to. This count value is then delivered to the subsequent subtracter 62. The subtracter 62 has an ideal count value produced when no frequency shifts occur, namely, $$(14.31818 \text{ (MHz)}/1747.8 \text{ (Hz)}) \times 256 = 2097152,$$

and subtracts the actual count value 2110221 from the ideal count value 2097152, and $$2110221 - 2097152 = 13069$$

is obtained. This result is transferred to the divider 63 and is divided into 256, $$13069/256 = 51.$$

This count value of 51 is the frequency-correction data 59 when the signal of 1737 Hz is input to the frequency-shift measuring counter 60.

Figure 6:
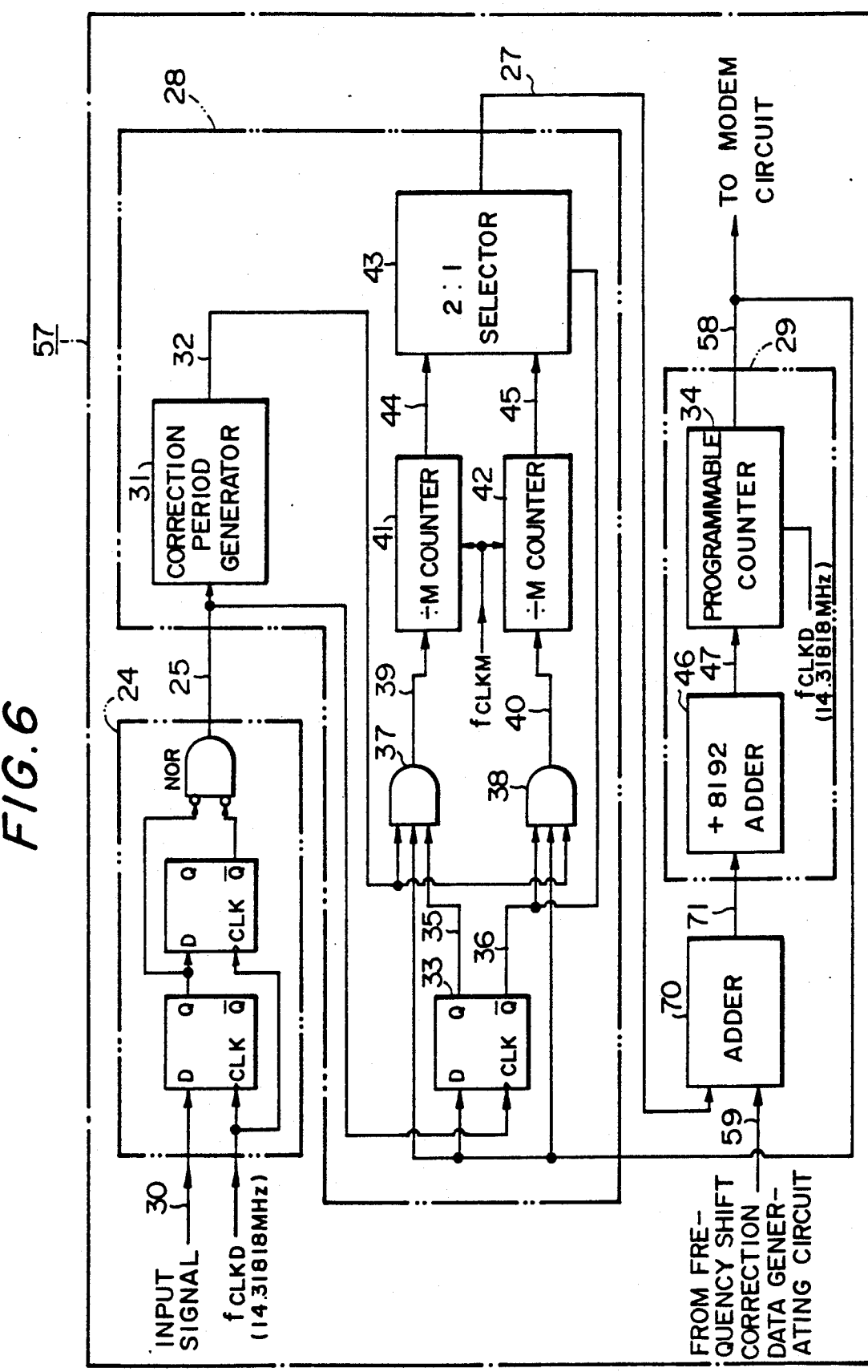
FIG. 6 is a block diagram of a demodulation timing generating circuit used in the static video telephone of FIG. 3.
Figure 7:
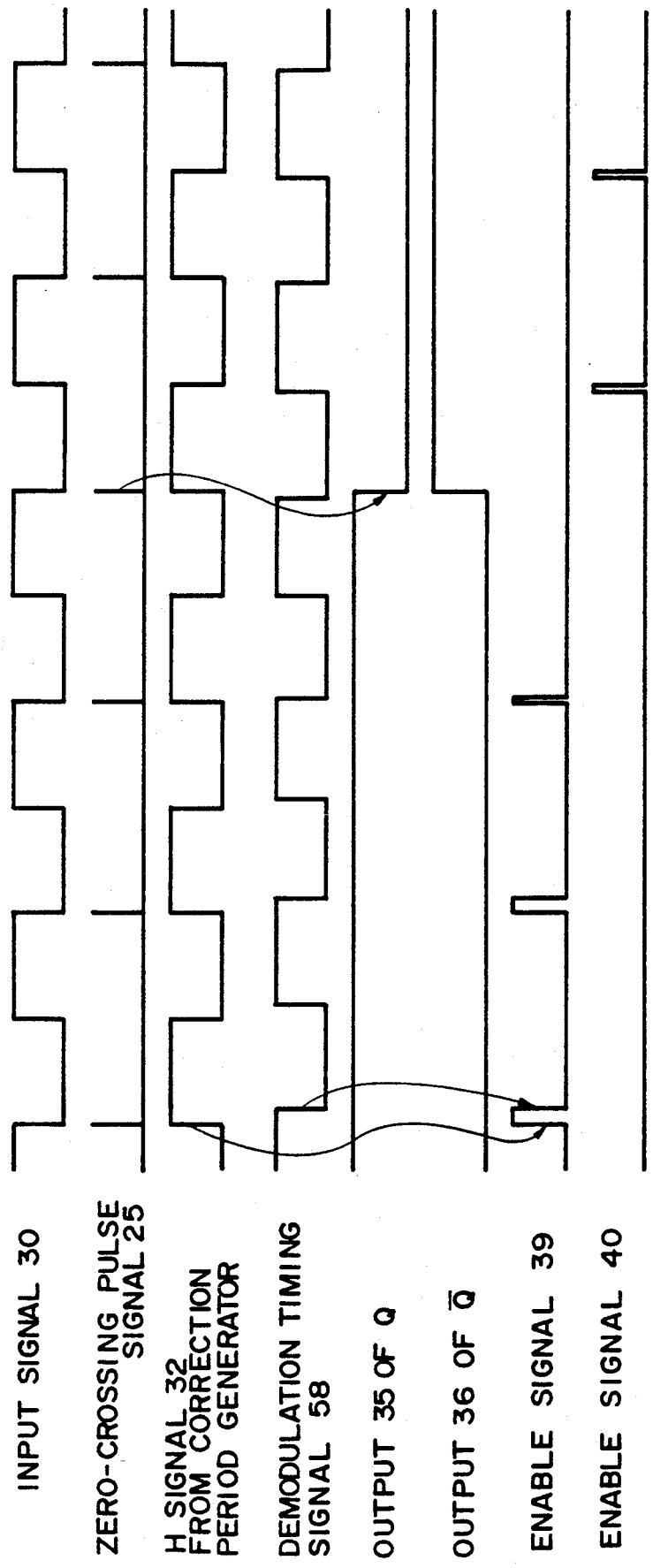
FIG. 7 is a timing chart of the demodulation timing generating circuit of FIG. 6.

Further, the correction of frequency-shift which is a feature of this invention will be described, referring to FIGS. 6 and 7. FIG. 6 is a block diagram of the demodulation timing generating circuit 57, and FIG. 7 is a timing chart of the demodulation timing signal generating circuit 57.

The leading and trailing edges of a signal 30 input by way of the modem circuit 9 are detected at every zero-crossing by means of two flipflops and a NOR gate in a zero-crossing detecting circuit 24 and is issued as the zero-crossing pulse signal 25. The zero-crossing pulse signal 25 is then input to a correction period generator 31.

The correction period generator 31 produces an output of a high signal 32 for a predetermined period, which is about half of 1747.8 Hz, for every input of zero-crossing pulse signal 25. At the same time, a D-Type flipflop 33 of a zero-crossing correction circuit 28 detects whether the trailing edge of the demodulation timing signal 68 advances or is delayed when compared with the zero-crossing pulse signal 25. If such a demodulation timing signal 58 as shown in FIG. 7 is output from a programmable counter 34, the D-Type flipflop 33 produces outputs of 35 and 36 of FIG. 7. Namely, during the H period of the signal 35, since the trailing edge of the demodulation timing signal 58 is delayed relative to the zero-crossing pulse signal 25, the programmable counter 34 is instructed to recover the loss. Meanwhile, during the H period of the signal 36, since the trailing edge of the demodulation timing signal 58 advances relative to the zero-crossing pulse signal 25, the programmable counter 34 is instructed to lose the excess. These signals 35 and 36 are input to AND gates 37, 38 which produce enable signals for error detecting counters 41, 42.

An output signal 39 of the AND gate 37 represents how much the demodulation timing signal is delayed, and an output signal 40 of the AND gate 38 represents how much the demodulation timing signal advances.

During the H period of the signals 39 and 40, subsequent counters 41, 42 are clocked by a clock signal $f_{CLKM}$ which is an integral submultiple M of the reference clock of 14.31818 MHz from the CPU 12. These count values are input to a 2:1 selector 43 as phase error data. The selector 43 selects a phase error signal 44 when the select signal 36 is low, while it selects phase error signal 45 when the select signal 36 is high, and phase error data 27 is sent from the selector to an error adder 70.

The error adder 70 adds the phase error data 27 and the frequency-shift correction data 59, and the added data is then delivered to a +8192 adder 46 as correction data 71. The +8192 adder 46 adds 8192 to the received correction data 71 and sends the data to the programmable counter 34 as frequency division data 47. Then, the programmable counter 34 divides the reference clock 14.31818 MHz in response to the frequency division data 47, and outputs the demodulation timing signal 58.

Third Embodiment

A static video telephone, employing a static video telephone receiving method, according to a third embodiment of this invention will now be described hereinbelow, referring to FIG. 8.

Figure 8:
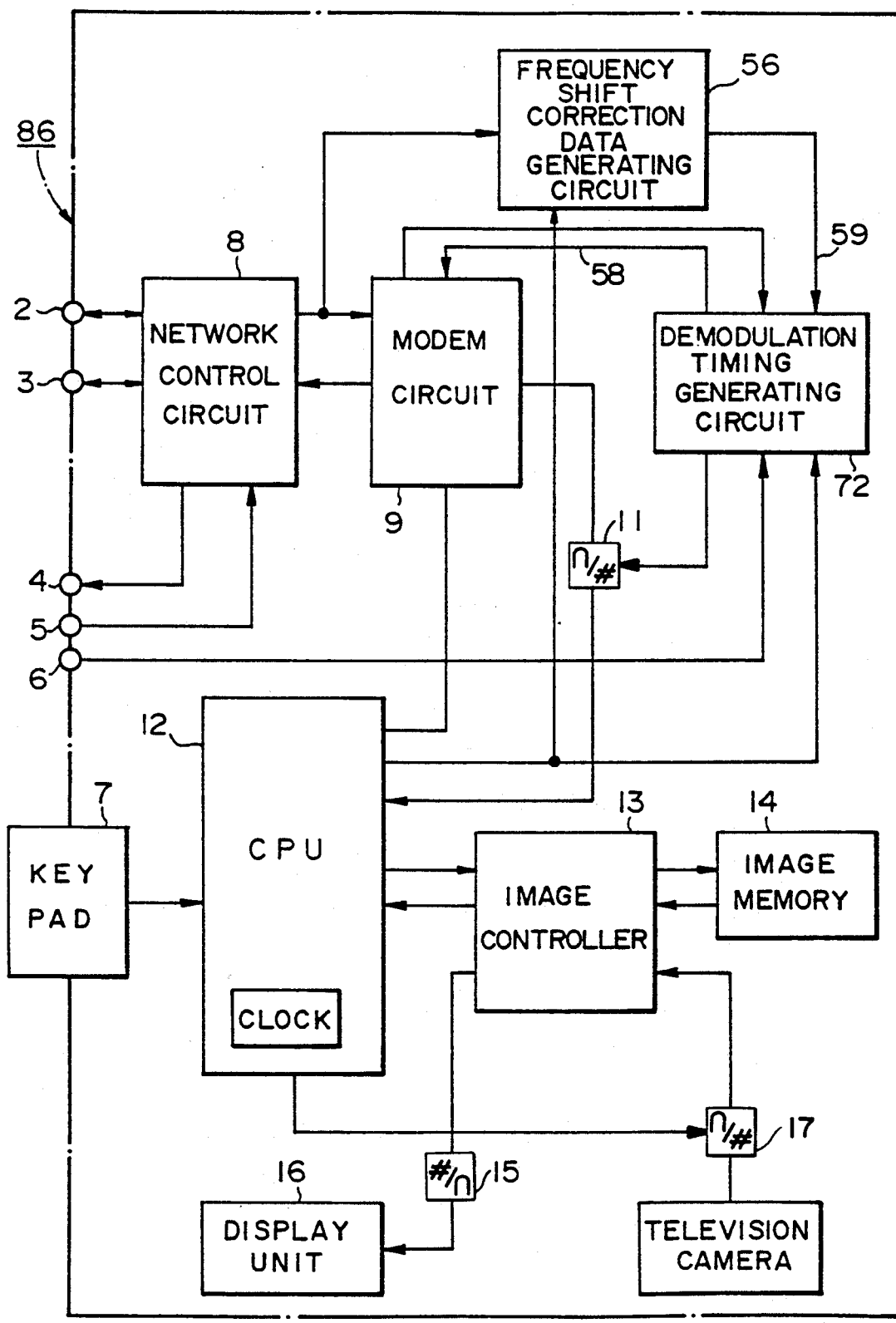
FIG. 8 is a block diagram of a static video telephone employing a method for a static video telephone receiving according to a third embodiment of the present invention.

FIG. 8 is a block diagram of the static video telephone according to the present invention. In FIG. 8, a video telephone set 86 comprises a network circuit 8 for receiving a static video signal transmitted over a telephone line; a frequency-shift correction data generating circuit 56, which is a feature this invention, for quantifying and scaling the error included in a frequency-shift data signal 48 of the received signal and for producing frequency-shift correction data 59; a demodulation timing signal generating circuit 72 for producing a demodulation timing signal 58 on the basis of the frequency-shift correction data 59, the received signal, and the reference clock from a CPU 12; a modem circuit 9 for demodulating the received signal in response to the demodulation timing signal 58; an image memory for storing image data quantified by an analog-digital converter 11 and transferred via the CPU 12 and, an image controller 13; a digital-analog converter 15 for converting stored image data into an analog video signal; and a display 16 for outputting the video signal visually.

On the exterior surface of the telephone set 86, there are provided a terminal 2 for connecting with a non-illustrated externally provided telephone; a terminal 3 for connecting with a telephone line; a recording terminal 4; a reproducing terminal 5; a conversation/image reproducing mode changeover switch 6; and a key pad 7.

The operation of the static video telephone employing the static video telephone receiving method according to this invention will now be described. A frame synchronization signal 21 of a static video signal input from the telephone line is demodulated by a demodulation signal without the frequency-shift correction data 59 in the same way as the conventional demodulation signal from the demodulation timing generating circuit 72, and the demodulated image data is then delivered to the CPU 12.

Upon detecting the end of the frame synchronization signal 21, the CPU 12 activates the frequency-shift correction data generating circuit 56. The frequency-shift correction data generating circuit 56 quantifies how much frequency shift occurs now in the telephone line, and sends the frequency-shift correction data 59 to the demodulation timing signal generating circuit 72.

The demodulation timing signal generating circuit 72 produces the demodulation timing signal 58 by adding the frequency-shift correction data 59 to a demodulation timing signal obtained from the received signal. The modem circuit 9 demodulates the received signal in response to this demodulation timing signal 58. Demodulated image data is transferred to and stored in the image memory 14 via the analog-digital converter 11, the CPU 12, and the image controller 13. This image data is then visually output on the display 16 by way of the image controller 13 and the digital-analog converter 15 for visual output.

Here, upon reference to FIGS. 4 and 5, the operation of the frequency-shift correction data generating circuit 56 will be explained.

In FIG. 4, the frequency-shift correction data generating circuit 56 is composed of a counter 60 for scaling the frequency shift; a 256-cycle counter 61 for producing an enable signal to activate the counter 60; a subtracter 62 for subtracting an actual count value of the frequency-shift measuring counter 60 from an ideal count value produced when no frequency shift occurs; and a divider 63 for dividing an output from the subtracter 62 into 256.

Assuming that the TTC standard signal at frequency of 1747.8 Hz transmitted for 256 cycles is being used for the frequency shift data signal 48 shown in FIG. 2, the operation of the 256-cycle counter 61 for producing the enable signal will be explained with reference to FIGS. 4 and 5.

First, a signal 64 is input to the 256-cycle counter 61 is input. This signal 64 represents leading and trailing edges at zero crossings of the received signal. Also, a signal 65 is the start signal of the frequency shift scaling, input from the CPU 12, which is high when the CPU instructs to start.

The 256-cycle counter 61 initiates its operation upon receiving of the signal 65, and issues a signal 66 at every 512 counts. The signal 66 becomes low level at every 512 counts, and is ANDed with the signal 65 and produces the signal 67 which is an enable signal for the 256-cycle counter 61.

The operation of the frequency-shift measuring counter 60 will be described. This counter 60 counts the reference clock of 14.31818 MHz from the CPU 12 during the high period of the signal 69. If the frequency signal is varied from 1747.8 Hz to 1737 Hz, then a value of (14.31818 (MHz)/1737 (Hz))×256=2110221 is counted to. This count value is then transferred to the subtracter 62. The subtracter 62 holds an ideal count value, that is, (14.31818 (MHz)/1747.8, (Hz))×256=2097152.

The subtracter 62 subtracts the actual count value (2110221) from the ideal count value (2097152).

2110221−2097152=13069.

This result is divided by the subsequent divider 63 into 256.

13069/256=51

The value of 51 is the frequency-shift correction data 59 when the signal of frequency 1737 Hz is input.

Figure 9:
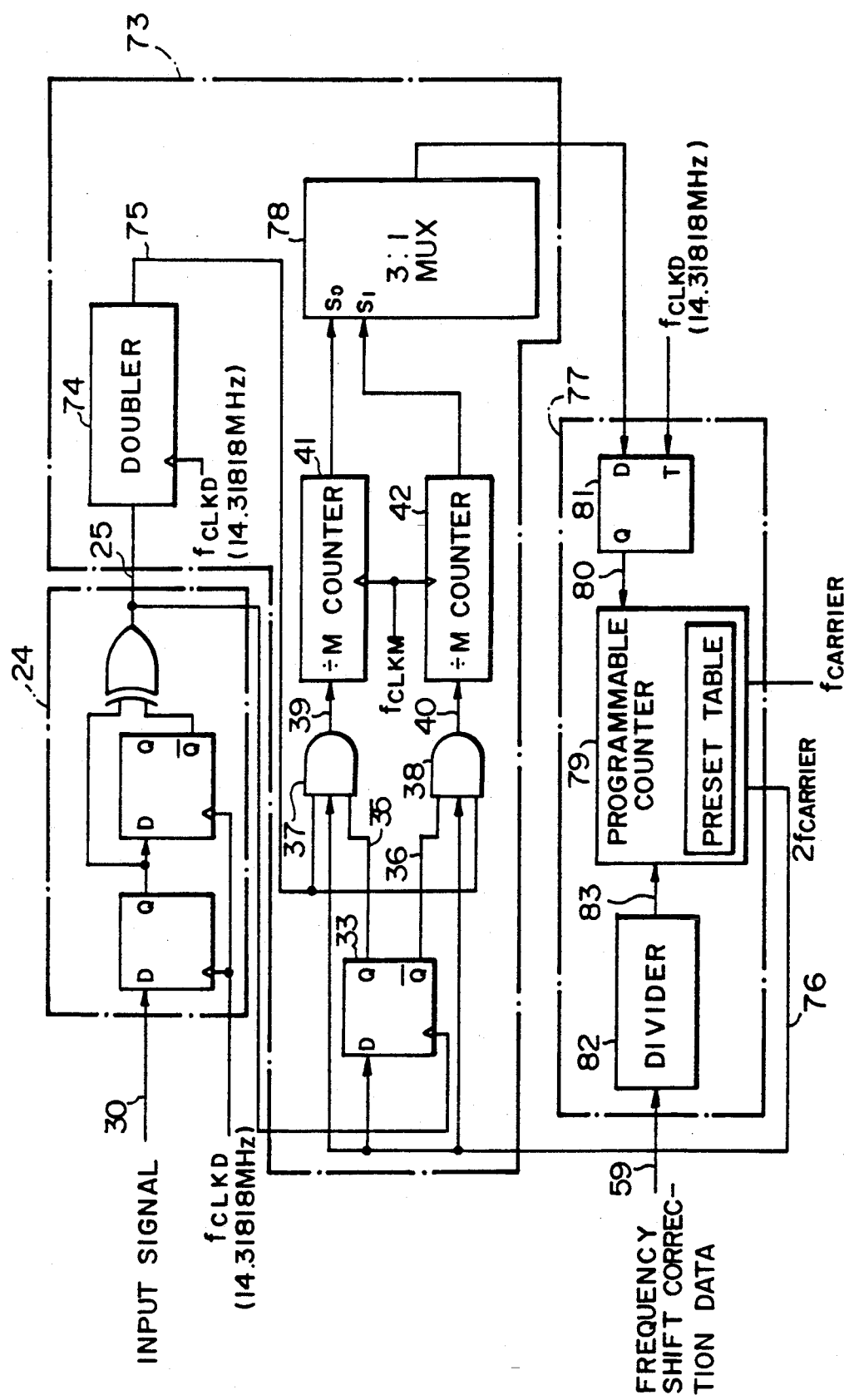
FIG. 9 is a block diagram of a demodulation timing generating circuit used in the static video telephone shown of FIG. 8.

The correction of the frequency shift will be described with reference to FIGS. 9 and 10. FIG. 9 is a block diagram of the demodulation timing generating circuit 72.

First, trailing edges of an input signal 30 are detected at its zero crossings by a frequency discriminator 24, and a zero-crossing pulse signal 25 is output. A doubler 74 of a zero-crossing correction circuit 73 produces a high output signal 75 for a predetermined period, that is, about a quarter of 1747.8 Hz, every input of the zero-crossing pulse signal 25.

At the same time, a D-Type flipflop 33 detects whether the leading and trailing edges of a demodulation timing signal 76 (2fcarrier) advances or is delayed when compared with the zero-crossing pulse signal 25. When a demodulation timing signal 76 of 2fcarrier equivalent to the signal 58 of FIG. 7 is output from a VCXO 77 (voltage controlled crystal oscillator), a D-Type flipflop 33 produces outputs 35, 36 of FIG. 7 from its Q and Q' terminals.

During the H period of the signal 35, since the demodulation timing signal 76 is delayed as compared to the zero-crossing pulse signal 25, the VCXO 77 is instructed to have extra counts.

Meanwhile, during the H period of the signal 36, since the demodulation timing signal 76 advances the zero-crossing pulse signal 25, the VCXO 77 is instructed to pause counting.

These signals 35 and 36 are input to AND gates 37 and 38 for producing enable signals of counters 41, 42 for scaling phase shifts. An output signal 39 of the AND gate 37 represents how much the demodulation timing signal 76 retards whereas an output signal 40 of the AND gate 38 represents how much the demodulation timing signal 76 advances.

Counters 41 and 42 are counted by $f_{CLKM}$, which is obtained by dividing the reference clock by an integral factor of M, during the H period of the signals 39 and 40. An instruction signal of advancing or retarding is issued to a multiplexer 3:1 MUX 78 at every one count.

In FIG. 9, the VCXO 77 comprises a D-Type flipflop 81 for outputting an enable signal 80 of a programmable counter 79; the programmable counter 79 for outputting the demodulation timing signal 76 (2fcarrier); and a ½ divider 82 for dividing the frequency-shift correction data 59. The D-Type flipflop 81 also functions to divide the reference clock ($f_{CLKD}$ of 14.31818 MHz) by 2. Accordingly, data P of an integral factor at the programmable counter 79 is given by

8192/2=4096.

Assuming that half of the reference signal of 14.31818 MHz is one cycle, outputs of the 3:1 MUX 78 are one cycle of half-high and half-low. These signals are triggered by the D-Type flipflop 81 and used as the enabled signal 80 of the programmable counter 79. This programmable counter 79 counts down usually from 4096 to 0 in accordance with an initial value table provided therewith, and effects a frequency division by 4096.

However, if the frequency shift occurs as being set forth in the above and the integral submultiple factor P is advanced, the multiplexer MUX 78 sends one cycle high to the D-Type flipflop 81. For instance, if the frequency-shift correction data of 30 counts are input to this programmable counter 79 via the ½ divider 82, when compared with the value of the initial value table, correction data will be given by

4096−(30/2)=4081

The counter 79 counts down from 4081 to 0, thereby effecting a frequency division with the integral submultiple of 4081.

As described above, in the conventional demodulation timing generator 10, the submultiple factor P for deducing the carrier frequency 1747.8 Hz from the reference clock of 14.31818 MHz was fixed to a value of 8192. This resulted in difficulty of correcting large scale errors such as a frequency shift though other small errors such as a phase shift could be corrected. According to this invention, however, since the submultiple factor P of the multiplexer 77 can be changed in response to the frequency-shift correction data 59 produced by the frequency-shift correction data generating circuit 56, it becomes possible to correct such a large scale error as a frequency shift of FIG. 10B.

Fourth Embodiment

Figure 11A:
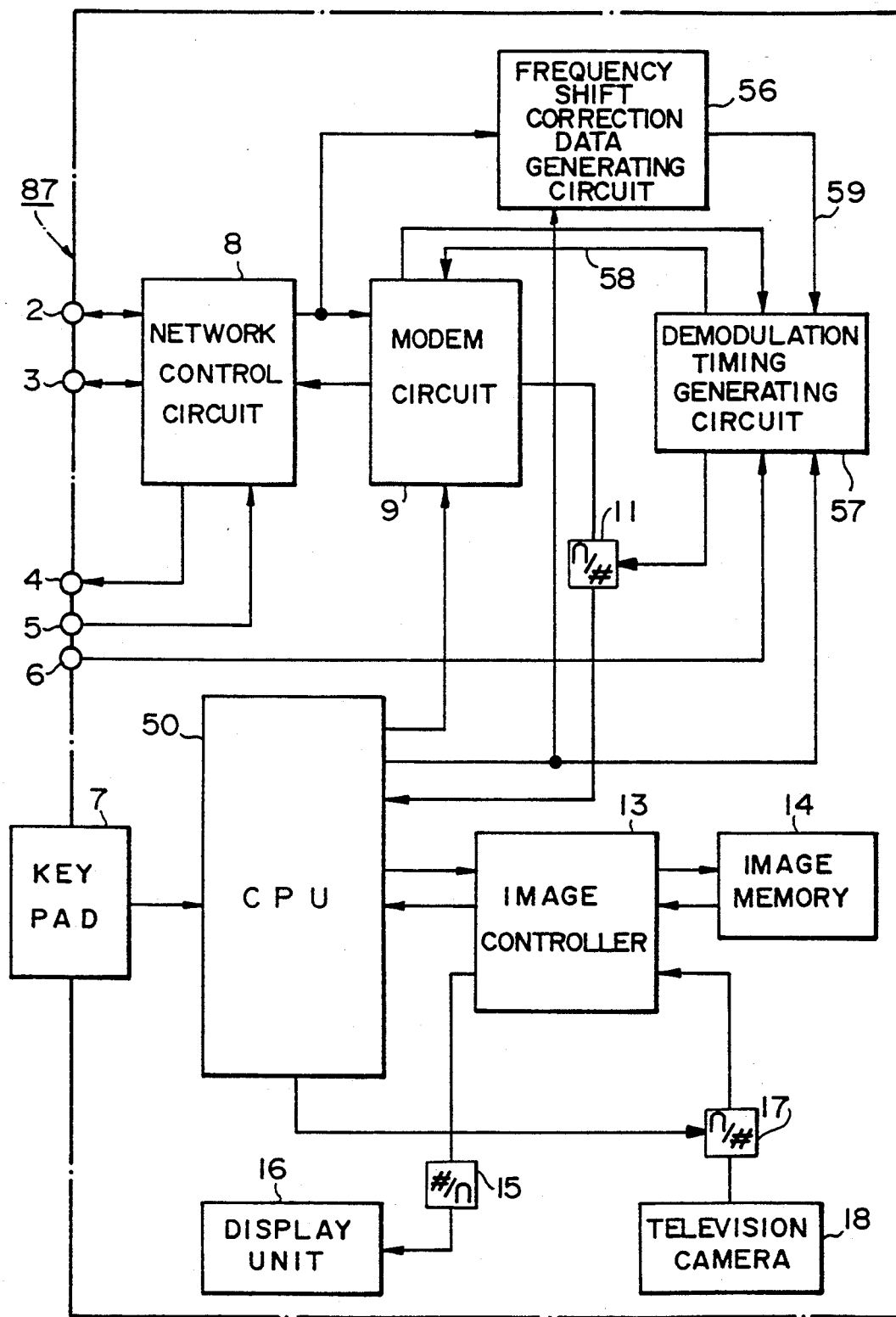
FIG. 11A is a block diagram of a static video telephone employing a method for a static video telephone transmission and receiving according to a fourth embodiment of the present invention.
Figure 11B:
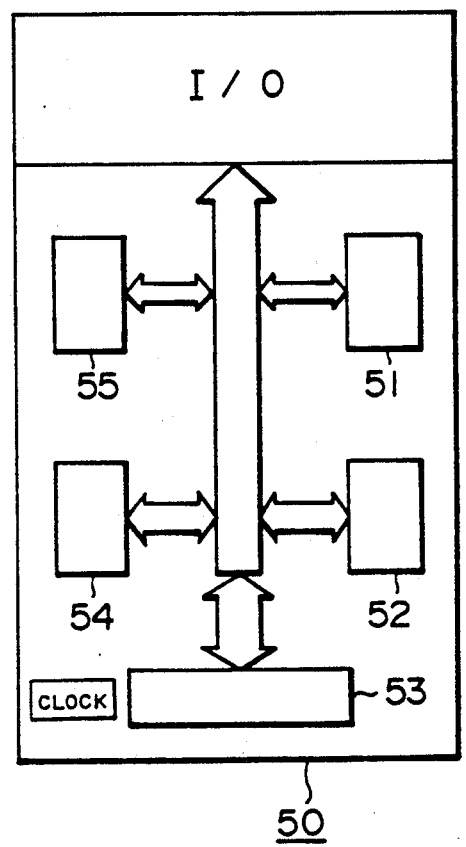
FIG. 11(B) is a block diagram of the internal structure of the CPU used in the method of FIG. 11A.
Figure 12:
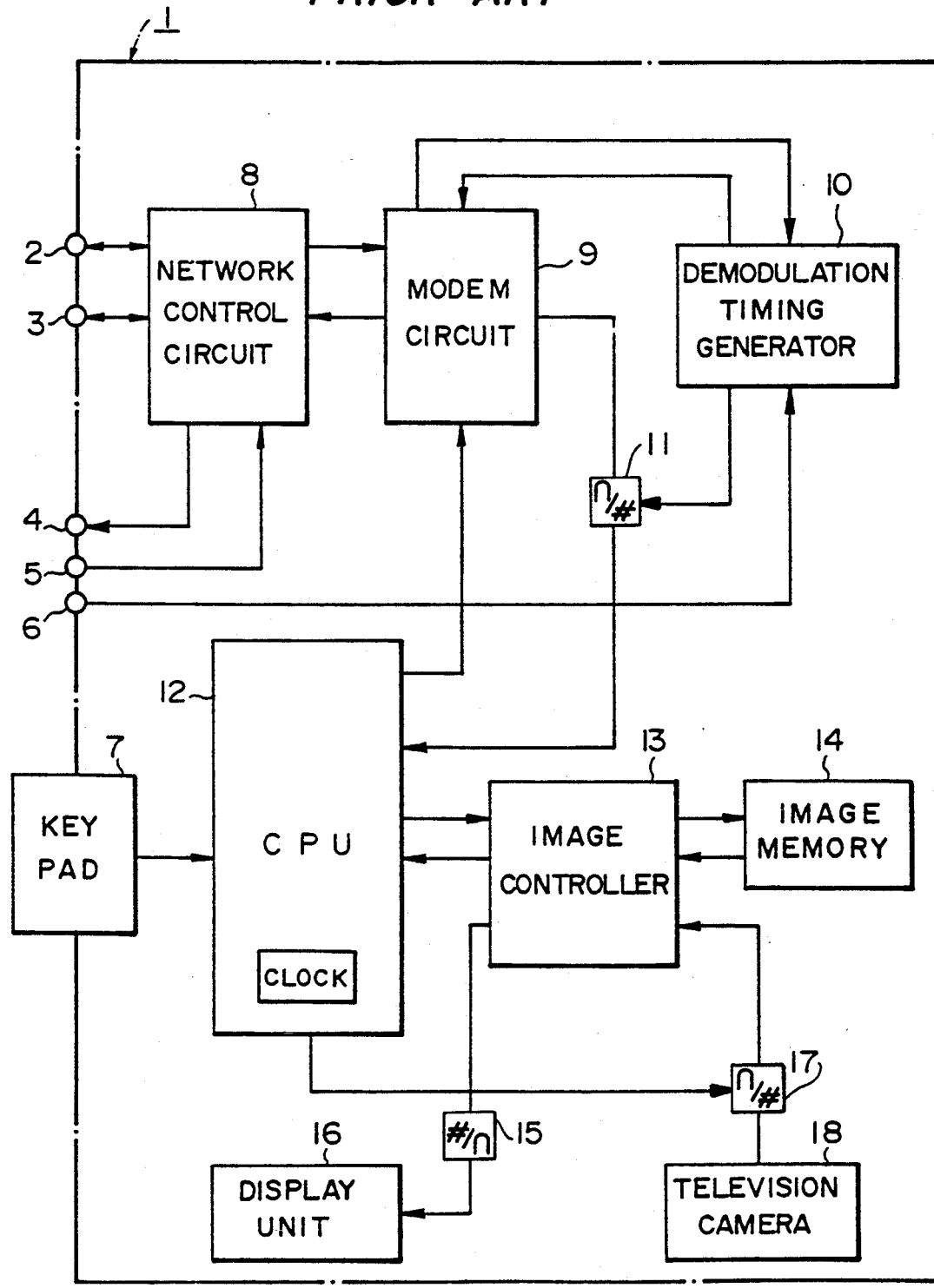
FIG. 12 is a block diagram of a conventional static video telephone.
Figure 13:
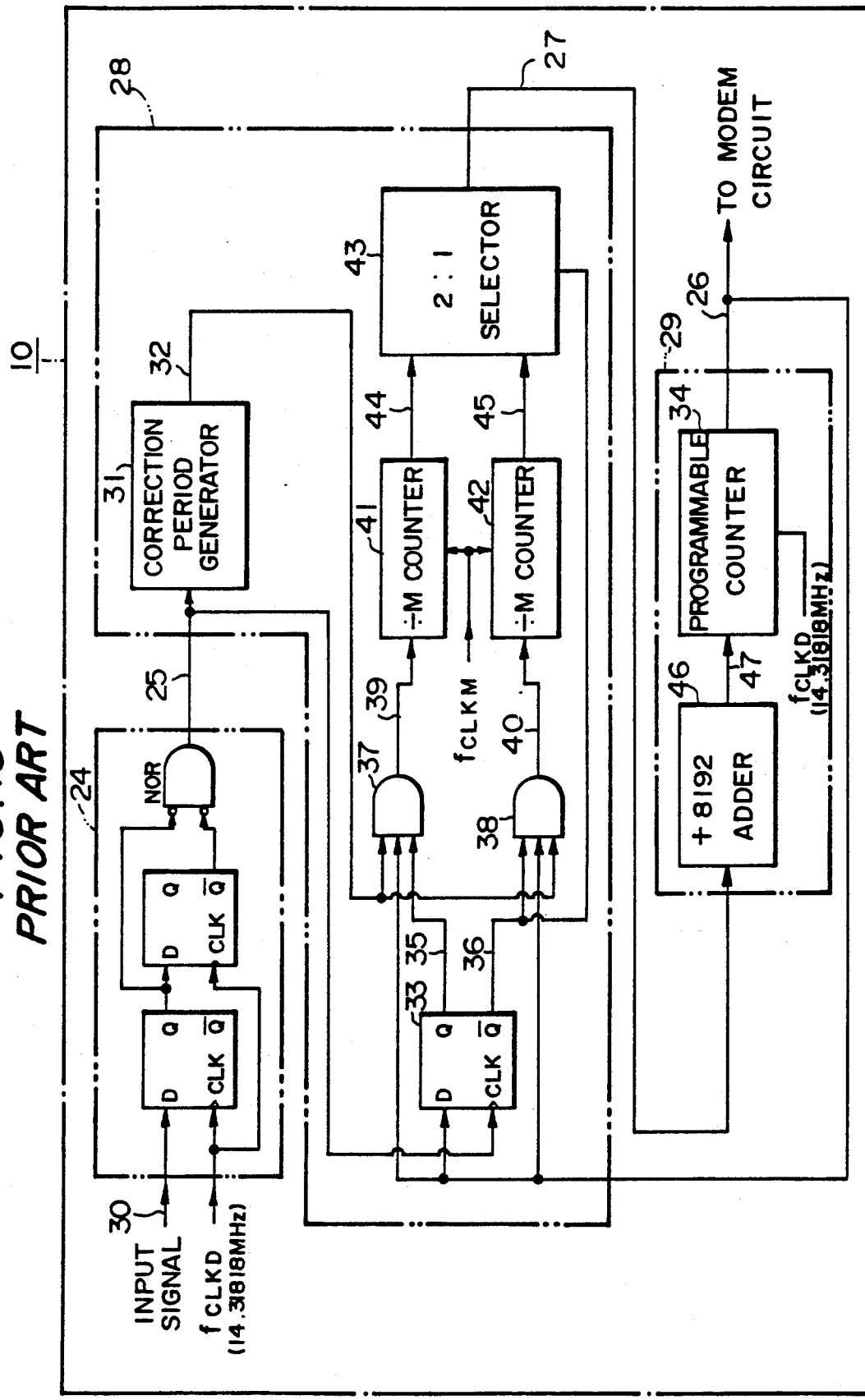
FIG. 13 is a block diagram of a demodulation timing generator circuit used in the conventional static video telephone of FIG. 12.

A static video telephone according to a fourth embodiment of the present invention will be described with reference to FIG. 11A. In FIG. 11, the static video telephone apparatus 87 comprises a network control circuit 8 for sending/receiving a static video signal; a modem circuit 9 for modulating the static video signal to be sent and demodulating the received static video signal; a frequency shift correction data generating circuit 56 for quantifying and scaling an error in the received signal and producing frequency-shift correction data 59; a demodulation timing generating circuit 57 for producing a demodulation timing signal 58 on the basis of the received signal, the frequency-shift correction data signal 59 and a phase-shift correction signal produced therein and providing the demodulation timing signal 58 to the modem circuit 9 for demodulation of the receiving signal; an analog-digital converter 11 for converting the demodulated analog video signal into digital image data; a central processing unit (CPU) 50 for supplying a clock signal and producing a video signal; an image controller 13 for controlling image data; an image memory 14 for storing image data; an analog-digital converter 17 for converting an analog video signal into digital image data; a television camera 18 for capturing images to be transmitted; a digital-analog converter 15 for converting stored image data into an analog image signal for visually outputting on a display unit 16.

On the exterior of the telephone apparatus 87, there are provided a terminal 2 for connecting with a non-illustrated external telephone set; a terminal 3 for connecting with a telephone line; a terminal for connecting with a tape recorder; a terminal 5 for reproducing an image; a conversation/image reproducing mode changeover switch 6; and a key pad for issuing an instruction to carry out video transmission, thereby establishing connection with external devices.

A frame format for executing a static video telephone transmission method will be described with reference to FIG. 2. In addition to the conventional frame synchronization signal 21, the amplitude correction signal 22, and the information data signal 23, the static video signal also consists of a control information block 49 further including a frequency shift data signal 48 for use in correcting impairments of the signal such as a frequency shift which occurs during transmission and an image data signal 20.

The issuing of an instruction to send images with the key pad 7 shown in FIG. 11 is detected by the CPU 50, and, in accordance with an internal program, the control information signal is added to the image data which has been captured by the television camera 18 and stored in the image memory 14 by means of a frame synchronization signal generating section 51, a frequency shift information signal generating section 52, an amplitude correction signal generating section 53, an information data generating section 54, and a video signal generating section 55, all of which are included inside the CPU 50, and the video signal having the frame format is then transferred to the modem circuit 9. The video signal subjected to the phase-amplitude modulation by the modem circuit 9 is then transmitted along the telephone line from the terminal 3 for the telephone line via the network circuit 8. The control information block 49 having been added to the video signal contains the frequency shift data signal characterizing the present invention.

The operation of the static video telephone employing the static video signal receiving method according to this invention will now be described with reference to FIG. 3.

Much as in the conventional static video telephone, the frame synchronization signal 21 of a static video signal input from the telephone line through the network circuit 8 is demodulated by means of a signal, from the demodulation timing signal generating circuit 57, which is not subjected to a correction in response to frequency shift correction data from the frequency shift correction data generating circuit 56, and the demodulated data is transferred to the CPU 12. When detecting the end of the frame synchronization signal 21, the CPU 12 activates the frequency shift correction data generating circuit 56. The frequency shift correction data generating circuit 56 detects how much frequency shift occurs in the telephone line now and sends the frequency shift correction data 59 to the demodulation timing generating circuit 57. The demodulation timing generating circuit 57 adds the frequency shift correction signal 59 to phase-shift correction data obtained from the receiving signal to produce a demodulation timing signal 58. The received static video signal is demodulated in the modem circuit 9 in response to the demodulation timing signal 58. Thus demodulated image signal is then stored in the image memory 14 as video data via the analog-digital converter 11, the CPU 12, and the image controller 13. The stored video data is visualized on the display 16 by way of the image controller 13 and the digital-analog converter 15.

The operation of the frequency-shift correction data generating circuit 56 according to the present invention will be described in detail with reference to FIGS. 4 and 5. FIG. 4 is a block diagram of the frequency-shift correction data generating circuit 56, and FIG. 5 is a timing chart of an enable signal for the frequency-shift measuring counter.

In FIG. 4, the frequency-shift correction data generating circuit 56 is composed of a counter 60 for measuring frequency shifts; a 256-cycle counter 61 for producing an enable signal for activating the counter; a subtracter 62 for subtracting an ideal count value obtained when no frequency shifts occur from an actual count value measured by the frequency-shift measuring counter 60; and a divider 63 for dividing the output from the subtracter 62 in 256.

Assuming that the TTC standard signal at the frequency of 1747.8 Hz transmitted for 256 cycles is being used for the frequency shift data signal 48 shown in FIG. 2, the operation of the enable signal generating section of the 256 cycle counter 61 will be described upon reference of FIGS. 3, 4, and 5.

First, a signal 64 of FIG. 5 such as a clock pulse signal is input to the 256-cycle counter 61. The leading edge and the trailing edge of the pulse represent the zero-crossings of the static video signal being input by way of the network circuit 8. Another signal 65 is a frequency-shift measuring start signal which starts at a high level delivered from the CPU 12. The 256-cycle counter 61 initiates its counting operation in response to the signal 65, and when the counter counts up to 512, a signal 66 is issued from the 256-cycle counter 61. This signal 66 becomes a low level at every 512 counts, and is ANDed with the signal 65 and produces the signal 67 which is an enable signal for the 256-cycle counter 61. However, this enable signal 67 cannot be a period of 256 cycles because the start signal 65 from the CPU 12 is not synchronous with the zero-crossing pulse signal 64. Accordingly, the signal 67 is synchronized with the zero crossing signal 64 at a D-Type flipflop 68 and is finally issued as being an enable signal 69 for the frequency-shift measuring counter 60.

Here, the operation of the frequency-shift measuring counter 60 will be explained. This counter 60 counts the reference clock of 14.31818 MHz issued from the CPU 12 during the H period of the signal 69.

In the case where the frequency signal of 1747.8 Hz is varied to a signal of 1737 Hz, a value of $$(14.31818 \text{ (MHz)}/1737 \text{ (Hz)}) \times 256 = 2110221$$

is counted to. This count value is then delivered to the subsequent subtracter 62. The subtracter 62 has an ideal count value at the time of no frequency shifts, namely, $$(14.31818 \text{ (MHz)}/1747.8 \text{ (Hz)}) \times 256 = 2097152,$$

and subtracts the actual count value 2110221 from the ideal count value 2097152, and $$2110221 - 2097152 = 13069$$

is obtained. This result is transferred to the divider 63 and is divided into 256, $$13069/256 = 51.$$

This count value of 51 is the frequency-correction data 59 when the signal of 1737 Hz was input to the frequency-shift measuring counter 60.

Further, the correction of frequency-shift featuring this invention will be described, referring to FIGS. 6 and 7. FIG. 6 is a block diagram of the demodulation timing generating circuit 57, and FIG. 7 is a timing chart of the demodulation timing signal generating circuit 57.

The leading and trailing edges of a signal 30 input by way of the modem circuit 9 are detected at every zero-crossing by means of two flipflops and a NOR gate in a zero-crossing detecting circuit 24 and is issued as the zero-crossing pulse signal 25. The zero-crossing pulse signal 25 is then input to a correction period generator 31.

The correction period generator 31 produces an output of a high signal 32 for a predetermined period, which is about half of 1747.8 MHz, every input of zero-crossing pulse signal 25. At the same time, a D-Type flipflop 33 of a zero-crossing correction circuit 28 detects whether the trailing edge of the demodulation timing signal 68 advances or retards when compared with the zero-crossing pulse signal 25. If such a demodulation timing signal 58 as shown in FIG. 7 is output from a programmable counter 34, the D-Type flipflop 33 produces outputs of 35 and 36 of FIG. 7. Namely, during the H period of the signal 35, since the trailing edge of the demodulation timing signal 58 retards relative to the zero-crossing pulse signal 25, the programmable counter 34 is instructed to have extra counts. Meanwhile, during the H period of the signal 36, since the trailing edge of the demodulation timing signal 58 advances relative to the zero-crossing pulse signal 25, the programmable counter 34 is instructed to pause counting. These signals 35 and 36 are input to AND gates 37, 38 which produce enable signals for error detecting counters 41, 42.

An output signal 39 of the AND gate 37 represents how much the demodulation timing signal retards, and an output signal 40 of the AND gate 38 represents how much the demodulation timing signal advances.

During the H period of the signals 39 and 40, subsequent counters 41, 42 are clocked by a clock signal $f_{CLKM}$ which is an integral submultiple M of the reference clock of 14.31818 MHz from the CPU 12. These count values are input to a 2:1 selector 43 as phase error data. The selector 43 selects a phase error signal 44 when the select signal 36 is low, while it selects a phase error signal 45 when the select signal 36 is high, and phase error data 27 is sent from the selector to an error adder 70.

The error adder 70 adds up the phase error data 27 and the frequency-shift correction data 59, and the added data is then delivered to a +8192 adder 56 as correction data 71. The +8192 adder 46 adds 8192 to the received correction data 71 and sends the data to the programmable counter 34 as frequency division data 47. Then, the programmable counter 34 divides the reference clock 14.31818 MHz in response to the frequency division data 47, and outputs it as the demodulation timing signal 58.

While this invention has been described with reference to an illustrative embodiment, this description is not intended to be construed in a limiting sense. Various modifications of the illustrative embodiment, as well as other embodiments of the invention, will be apparent to those who are versed in the art upon reference to this description. It is, therefore, contemplated that the appended claims will cover any such modifications or embodiments as fall within the true scope of the invention.

What is claimed is:

1. A static video telephone apparatus for transmitting an image captured by an image-capture system and receiving a static video signal transmitted over a telephone line, the video telephone comprises:
    (a) an external input means for issuing an instruction to switch to a transmission mode;
    (b) an image data producing block for capturing an image in accordance with the switching instruction from the input means, storing the captured image data, and visually outputting the image data once stored;
    (c) an interface means for transmitting or receiving a video signal along a telephone line;
    (d) a central processing means, connected to the image data producing block, for forming a video signal having a predetermined frame format on the basis of the image data stored in the image data generating means and controlling the entire system;
    (e) a modulating and demodulating means, connected to the interface means and the central processing means, for modulating the video signal for transmission or for demodulating the received signal into an image signal;
    (e) a modulating and demodulating means, connected to the interface means and the central processing means, for modulating the video signal for transmission or for demodulating the received signal into an image signal;
    (f) a demodulation timing generating block, connected to the interface means and the modulating and demodulating means, for producing a demodulation timing signal, wherein the image data producing block further comprises;
    a television camera;
    an image control means for controlling image data captured through the television camera; and
    a memory means for storing the image data, and the central processing means further comprising;
    a clock for supplying a reference clock signal;
    a function block for generating a frame synchronization signal;
    a function block for generating a frequency shift data signal;
    a function block for generating an amplitude calibration signal;
    a function block for generating an identification data signal; and
    a function block for substantially forming a video signal by combining together the frame synchronization signal, the frequency shift data signal, the amplitude calibration signal, the identification data signal and image data from the memory.

2. A static video telephone apparatus according to claim 1, wherein the demodulation timing generating block further comprises:
    a demodulation timing generating circuit including a zero-crossing detecting means for counting zero crossings in the received signal with a reference clock signal to produce a zero-crossing signal, an error detecting means for scaling error upon reference to the zero-crossing signal to produce error correction data, an adding means connected to the frequency-shift correction data generating circuit and the error detecting means for adding frequency-shift correction data and error correction data to provide a demodulation timing data, and a demodulation timing generating means for outputting a demodulation timing signal on the basis of the demodulation timing signal, and the demodulation timing generating means connected to the adding means and being composed of an adding means and a programmable counter; and the demodulation timing generating circuit including a zero-crossing detecting means for counting zero crossings in the received signal with a reference clock signal to produce a zero-crossing signal, an error detecting means for scaling errors upon reference to the zero-crossing signal to produce error correction data, a demodulation timing signal generating means for producing a demodulation timing signal on the basis of frequency-correction data and error correction data, and the demodulation timing signal generating means connected to the frequency-shift correction data generating circuit and the error detecting means and being composed of a divider, a programmable counter including a preset table and a flipflop.

3. A transmission method for sending an image captured by an image-capture system along a telephone line, the transmission method comprising the steps of:
(a) capturing an image upon receipt of an instruction to switch to a transmission mode;
(b) transforming captured images into image data;
(c) producing a video signal having a predetermined frame format for transmission;
(d) modulating the video signal;
(e) sending out the modulated video signal along the telephone line, wherein the video signal producing step further includes the steps of:
producing a frame synchronization signal;
producing a frequency shift data signal;
producing an amplitude calibration signal;
producing an information data signal; and
forming a video signal by combining the frame synchronization signal, the frequency shift signal, the amplitude calibration signal, the information data signal, and the image data.

4. A receiving method for a static video telephone apparatus for receiving a video signal transmitted over a telephone line, the method comprising the steps of:
(a) receiving a static video signal;
(b) generating a demodulation timing signal by scaling and quantifying errors in the received signal and correcting them;
(c) demodulating the received signal by the use of the demodulation timing signal and transforming the demodulated signal into the image data;
(d) storing the image data;
(e) visually outputting the stored image data after conversion to analog, wherein the demodulation timing signal production further comprises the steps of:
scaling phase shifts in the received signal to produce phase-shift correction data;
counting zero crossings of the received signal;
scaling errors in the received signal with reference to the zero-crossing signal to produce error correction data;
adding error correction data and phase-shift correction data to produce demodulation timing data;
generating demodulation timing signal on the basis of said demodulating timing data.

5. A receiving method according to claim 4, wherein the frequency-shift correction data producing step further comprises the steps of:
generating an enable signal every 512 counts by counting zero crossing of the received signal;
synchronizing the enable signal and the reference clock;
comparing the reference clock and the synchronized enable signal and quantifying frequency shifts in the received signal to produce an actual value of frequency shifts
subtracting the actual value from reference count values at the time of no frequency shift; and
dividing the obtained result by 256 cycles to produce frequency-shift correction data.

6. A method of transmitting and receiving a video signal captured by an image-capture system along a telephone line, the transmitting and receiving method consisting of a receiving-mode step and a transmitting-mode step, the transmitting-mode step further comprising the steps of:
(a) capturing an image;
(b) transforming the image into image data;
(c) temporarily storing image data;
(d) producing a video signal with a predetermined frame format on the basis of image data;
(e) Demodulating image data for transmission; and
(f) transmitting image data, whereby the video signal can be transmitted along a telephone line, and
the receiving-mode step further comprising the steps of:
(g) receiving a video signal;
(h) producing a demodulation timing signal by scaling and correcting errors included in the received signal;
(i) demodulating the received signal into a video signal in response to the demodulation timing signal;
(j) transforming the video signal into image data;
(k) temporarily storing image data;
(l) transforming image data into a video signal; and
(m) visually outputting an image, whereby the received video signal is visually displayed.

7. A transmitting and receiving method according to claim 6, wherein the step for producing a video signal for transmission includes the steps of:
producing a frame synchronization signal;
producing a frequency shift data signal;
producing an amplitude calibration; signal;
producing an information data signal; and
forming a video signal by combining the frame synchronization signal, the frequency shift signal, the amplitude calibration signal, the information data signal, and image data.

8. A transmitting and receiving method according to claim 7, wherein the demodulation timing signal producing step further comprises the steps of:
scaling phase shifts in the received signal to produce phase-shift correction data;
counting zero crossings of the received signal;
scaling errors in the received signal with reference to the zero-crossing signal to produce error correction data;
adding error correction data and phase-shift correction data to produce demodulation timing data;
generating a demodulation timing signal on the basis of demodulating timing data.

9. A transmitting and receiving method according to claim 8, wherein the frequency-shift correction data generator step further comprises the steps of:
generating an enable signal every 512 counts by counting zero crossing of the received signal;

synchronizing the enable signal and the reference clock;

comparing the reference clock and the synchronized enable signal and quantifying frequency shifts in the received signal to produce an actual value of frequency shifts subtracting the actual value from the reference count values at the time of no frequency shift; and dividing the obtained result by 256 cycles to produce frequency-shift correction data.

10. A static video telephone apparatus for receiving a video signal transmitted over a telephone line, the video telephone apparatus comprising:

(a) an interface means for receiving image signals transmitted over the telephone line;

(b) a demodulation timing generating block, connected to the interface means, for generating a demodulation timing signal by detecting and correcting errors in the received signal;

(c) a demodulating means, connected to the interface means, for demodulating the received signal in response to the demodulation timing signal;

(d) a central processing means, connected to the demodulating means and the demodulation timing means, for supplying a reference clock signal and controlling the entire apparatus including the interface mans, the demodulation timing means and the demodulating means;

(e) an image generating block, connected to the central processing means, for storing, transforming and visually outputting demodulated image data transferred via the central processing means, wherein the demodulation timing generating block further comprises;

a frequency-shift correction data generating circuit for quantifying and scaling frequency shifts in the received signal to produce frequency-shift correction data; and a demodulation timing generating circuit, connected to the frequency-shift correction data generating circuit, for generating scaling and correcting errors in the received signal to produce error correction data and producing a demodulation timing signal in combination with frequency-shift correction data and phase error correction data.

11. A static video telephone apparatus according to claim 10, wherein the demodulation timing generating circuit further comprises:

a zero-crossing detecting means for counting zero crossings in the received signal with a reference clock signal to produce a zero-crossing signal;

an error detecting means for scaling errors upon reference to the zero-crossing signal to produce error correction data;

an adding means, connected to the frequency-shift correction data generating circuit and the error detecting means, for adding frequency-shift correction data and error correction data to provide demodulation timing data; and a demodulation timing generating means for outputting a demodulation timing signal on the basis of the demodulation timing signal, and the demodulation timing generating means connected to the adding means and being composed of an adding means and a programmable counter.

12. A static video telephone apparatus according to claim 10, wherein the demodulation timing generating circuit further comprises:

a zero-crossing detecting means for counting zero crossings in the received signal with a reference clock signal to produce a zero-crossing signal;

an error detecting means for scaling errors upon reference to the zero-crossing signal to produce error correction data;

a demodulation timing signal generating means for producing a demodulation timing signal on the basis of frequency-correction data and phase error correction data, and the demodulation timing signal generating means connected to the frequency-shift correction data generating circuit and the phase error detecting means and being composed of a divider, a programmable counter including a preset table and a flipflop.

13. A static video telephone apparatus according to claim 10, wherein the frequency shift correction data generating circuit further comprises:

an enable signal generating means for issuing an enable signal by counting 512 zero crossings in response to a reference clock signal;

a synchronizing means, connected to the enable signal generating means, for synchronizing the enable signal and the reference clock signal;

a counting means, connected to the synchronizing means, for counting upon receipt of the enable signal in response to the reference clock signal;

a subtracter, connected to the counting means, for subtracting a result of the counting from an ideal count value at the time of no frequency shift; and a divider, connected to the subtracter, for dividing a result of the subtracter by 256 cycles.

14. A static video telephone apparatus for transmitting an image captured by an image-capture system along a telephone line, the telephone apparatus comprising:

(a) an external input means for issuing an instruction to switch to a transmission mode;

(b) an image data producing block for capturing an image in accordance with the switching instruction from the input means and storing the captured image data;

(c) a central processing means for producing a video signal on the basis of the image data stored in the image data generating means and controlling the entire system;

(d) a modulating means for modulating the image data delivered via the central processing unit;

(e) an interface means for sending out the modulated video signal; and wherein the central processing means further comprises:

a clock for supplying a reference clock signal;

a function block for generating a frame synchronization signal;

a function block for generating a frequency shift data;

a function block for generating an amplitude calibration signal;

a function block for generating an identification data signal; and a function block for forming a video signal by combining together the frame synchronization signal, the frequency shift data signal, the amplitude calibration signal, the identification data signal and image data from the memory.

* * * * *